(12) United States Patent
Klasen-Memmer et al.

(10) Patent No.: US 7,767,280 B2
(45) Date of Patent: Aug. 3, 2010

(54) LIQUID-CRYSTALLINE MEDIUM

(75) Inventors: Melanie Klasen-Memmer, Heuchelheim (DE); Matthias Bremer, Darmstadt (DE)

(73) Assignee: Merck Patent Gesellschaft Mit Beschrankter Haftung, Darmstadt (DE)

( * ) Notice: Subject to any disclaimer, the term of this patent is extended or adjusted under 35 U.S.C. 154(b) by 0 days.

(21) Appl. No.: 12/068,882

(22) Filed: Feb. 13, 2008

(65) Prior Publication Data

US 2008/0191167 A1    Aug. 14, 2008

(30) Foreign Application Priority Data

Feb. 13, 2007    (DE)    ........................ 10 2007 007 609

(51) Int. Cl.
C09K 19/44    (2006.01)
C09K 19/32    (2006.01)
C09K 19/34    (2006.01)
C09K 19/12    (2006.01)

(52) U.S. Cl. .............. 428/1.1; 252/299.62; 252/299.63; 252/299.66

(58) Field of Classification Search ................... 428/1.1; 252/299.63, 299.66, 299.62
See application file for complete search history.

(56) References Cited

U.S. PATENT DOCUMENTS 6,933,022 B2 *   8/2005  Klasen-Memmer et al.  .. 428/1.1

* cited by examiner

*Primary Examiner*—Shean C Wu

(74) *Attorney, Agent, or Firm*—Millen, White, Zelano & Branigan, P.C.

(57) ABSTRACT

Disclosed are a liquid-crystalline medium of negative dielectric anisotropy based on a mixture of polar compounds, which contains at least one compound of formula IA

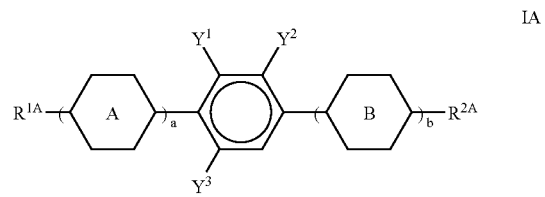

and at least one compound of formulae IB, IC and/or ID

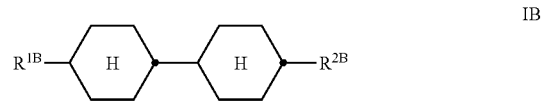

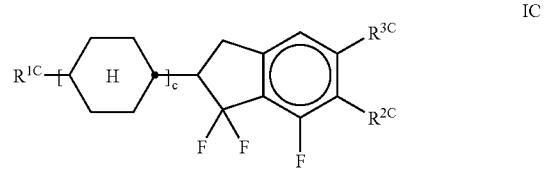

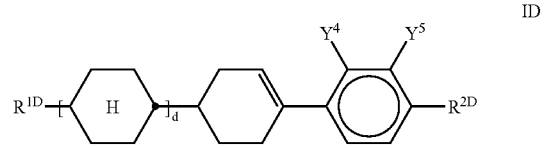

and the use thereof for an active-matrix display, in particular based on the ECB, PALC, FFS or IPS effect.

12 Claims, No Drawings

LIQUID-CRYSTALLINE MEDIUM

The invention relates to a liquid-crystalline medium of negative dielectric anisotropy based on a mixture of polar compounds, which comprises at least one compound of the formula IA

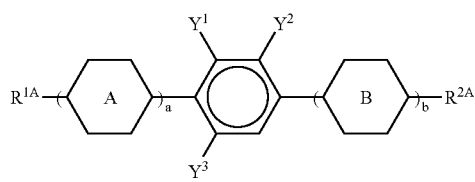

and at least one compound selected from the group of the compounds of the formulae IB, IC and ID

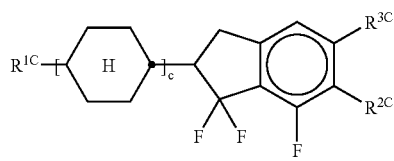

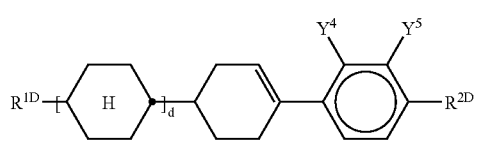

in which $R^{1A}$ and $R^{1B}$ each, independently of one another, denote an alkenyl radical having up to 6 C atoms which is unsubstituted, monosubstituted by CN or $CF_3$ or at least monosubstituted by halogen, where, in addition, one or more $CH_2$ groups in these radicals may be replaced by —O—, —S—,

—C≡C—, —$CF_2$O—, —$OCF_2$—, —OC—O— or —O—CO— in such a way that O atoms are not linked directly to one another, $R^{2A}$, $R^{2B}$, $R^{1C}$, $R^{1D}$ and $R^{2D}$ each, independently of one another, denote an alkyl or alkenyl radical having up to 6 C atoms which is unsubstituted, monosubstituted by CN or $CF_3$ or at least monosubstituted by halogen, where, in addition, one or more $CH_2$ groups in these radicals may be replaced by —O—, —S—,

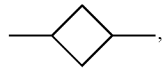

—C≡C—, —$CH_2$O—, —$OCF_2$—, —OC—O— or —O—CO— in such a way that O atoms are not linked directly to one another,

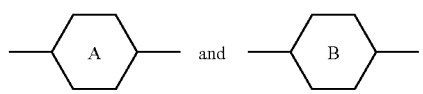

each, independently of one another, denote

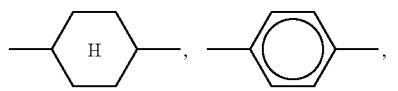

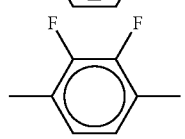

$Y^1$, $Y^2$, $Y^4$ and $Y^5$ each, independently of one another, denote F, Cl, $CF_3$, $CHF_2$, $CH_2F$, $OCF_3$, $OCH_2F$, $OCHF_2$ or CN, $Y^3$ denotes H or $CH_3$, $R^{2C}$ denotes H or F, $R^{3C}$ denotes H, $CH_3$, $C_2H_5$ or n-$C_3H_7$, a and b each, independently of one another, denote 0, 1 or 2, where a+b is $\geq 1$, c denotes 1 or 2, and d denotes 0 or 1.

Media of this type can be used, in particular, for electro-optical displays having active-matrix addressing based on the ECB effect and for IPS (in-plane switching) displays or FFS (fringe field switching) displays. The medium according to the invention preferably has negative dielectric anisotropy.

The principle of electrically controlled birefringence, the ECB effect or also DAP (deformation of aligned phases) effect was described for the first time in 1971 (M. F. Schieckel and K. Fahrenschon, "Deformation of nematic liquid crystals with vertical orientation in electrical fields", Appl. Phys. Lett. 19 (1971), 3912). This was followed by papers by J. F. Kahn (Appl. Phys. Lett. 20 (1972), 1193) and G. Labrunie and J. Robert (J. Appl. Phys. 44 (1973), 4869).

The papers by J. Robert and F. Clerc (SID 80 Digest Techn. Papers (1980), 30), J. Duchene (Displays 7 (1986), 3) and H. Schad (SID 82 Digest Techn. Papers (1982), 244) showed that liquid-crystalline phases must have high values for the ratio of the elastic constants $K_3/K_1$, high values for the optical anisotropy $\Delta n$ and values for the dielectric anisotropy of $\Delta\epsilon \leq -0.5$ in order to be suitable for use in high-information display elements based on the ECB effect. Electro-optical display elements based on the ECB effect have a homeotropic edge alignment (VA technology=vertically aligned). Dielectrically negative liquid-crystal media can also be used in displays which use the so-called IPS or FFS effect.

Displays which use the ECB effect, as so-called VAN (vertically aligned nematic) displays, for example in the MVA (multi-domain vertical alignment, for example: Yoshide, H. et al., paper 3.1: "MVA LCD for Notebook or Mobile PCs . . . ", SID 2004 International Symposium, Digest of Technical Papers, XXXV, Book I, pp. 6 to 9, and Liu, C. T. et al., paper 15.1: "A 46-inch TFT-LCD HDTV Technology . . . ", SID 2004 International Symposium, Digest of Technical Papers, XXXV, Book II, pp. 750 to 753), PVA (patterned vertical alignment, for example: Kim, Sang Soo, paper 15.4: "Super PVA Sets New State-of-the-Art for LCD-TV", SID 2004 International Symposium, Digest of Technical Papers, XXXV, Book II, pp. 760 to 763), ASV (advanced super view, for example: Shigeta, Mitzuhiro and Fukuoka, Hirofumi, paper 15.2: "Development of High Quality LCDTV", SID 2004 International Symposium, Digest of Technical Papers, XXXV, Book II, pp. 754 to 757) modes, have established themselves as one of the three more recent types of liquid-crystal display that are currently the most important, in particular for television applications, besides IPS (in-plane switching) (for example: Yeo, S. D., paper 15.3: "An LC Display for the TV Application", SID 2004 International Symposium, Digest of Technical Papers, XXXV, Book II, pp. 758 & 759) and the long-known TN (twisted nematic) displays. The technologies are compared in general form, for example, in Souk, Jun, SID Seminar 2004, Seminar M-6: "Recent Advances in LCD Technology", Seminar Lecture Notes, M-6/1 to M-6/26, and Miller, Ian, SID Seminar 2004, Seminar M-7: "LCD-Television", Seminar Lecture Notes, M-7/1 to M-7/32. Although the response times of modern ECB displays have already been significantly improved by addressing methods with overdrive, for example: Kim, Hyeon Kyeong et al., paper 9.1: "A 57-in. Wide UXGA TFT-LCD for HDTV Application", SID 2004 International Symposium, Digest of Technical Papers, XXXV, Book I, pp. 106 to 109, the achievement of video-compatible response times, in particular on switching of grey levels, is still a problem which has not yet been satisfactorily solved.

Industrial application of this effect in electro-optical display elements requires LC phases, which have to satisfy a multiplicity of requirements. Particularly important here are chemical resistance to moisture, air and physical influences, such as heat, infrared, visible and ultraviolet radiation and direct and alternating electric fields.

Furthermore, industrially usable LC phases are required to have a liquid-crystalline mesophase in a suitable temperature range and low viscosity.

None of the series of compounds having a liquid-crystalline mesophase that are known to date includes a single compound which meets all these requirements. Mixtures of two to 25, preferably three to 18, compounds are therefore generally prepared in order to obtain substances which can be used as LC phases. However, optimum phases could not be prepared easily in this way since no liquid-crystal materials having significantly negative dielectric anisotropy and adequate long-term stability were hitherto available.

Matrix liquid-crystal displays (MLC displays) are known. Non-linear elements which can be used for individual switching of the individual pixels are, for example, active elements (i.e. transistors). The term "active matrix" is then used, where a distinction can be made between two types:
1. MOS (metal oxide semiconductor) transistors on a silicon wafer as substrate
2. thin-film transistors (TFTs) on a glass plate as substrate.

In the case of type 1, the electro-optical effect used is usually dynamic scattering or the guest-host effect. The use of single-crystal silicon as substrate material restricts the display size, since even modular assembly of various part-displays results in problems at the joints.

In the case of the more promising type 2, which is preferred, the electro-optical effect used is usually the TN effect.

A distinction is made between two technologies: TFTs comprising compound semiconductors, such as, for example, CdSe, or TFTs based on polycrystalline or amorphous silicon. The latter technology is being worked on intensively worldwide.

The TFT matrix is applied to the inside of one glass plate of the display, while the other glass plate carries the transparent counterelectrode on its inside. Compared with the size of the pixel electrode, the TFT is very small and has virtually no adverse effect on the image. This technology can also be extended to fully colour-capable displays, in which a mosaic of red, green and blue filters is arranged in such a way that a filter element is opposite each switchable pixel.

The TFT displays disclosed hitherto usually operate as TN cells with crossed polarizers in transmission and are back-lit.

The term MLC displays here covers any matrix display with integrated non-linear elements, i.e. besides the active matrix, also displays with passive elements, such as varistors or diodes (MIM=metal-insulator-metal).

MLC displays of this type are particularly suitable for TV applications (for example pocket TVs) or for high-information displays in automobile or aircraft construction. Besides problems regarding the angle dependence of the contrast and the response times, difficulties also arise in MLC displays due to insufficiently high specific resistance of the liquid-crystal mixtures [TOGASHI, S., SEKIGUCHI, K., TANABE, H., YAMAMOTO, E., SORIMACHI, K., TAJIMA, E., WATANABE, H., SHIMIZU, H., Proc. Eurodisplay 84, September. 1984: A 210-288 Matrix LCD Controlled by Double Stage Diode Rings, pp. 141 ff., Paris; STROMER, M., Proc. Eurodisplay 84, September. 1984: Design of Thin Film Transistors for Matrix Addressing of Television Liquid Crystal Displays, pp. 145 ff., Paris]. With decreasing resistance, the contrast of an MLC display deteriorates. Since the specific resistance of the liquid-crystal mixture generally drops over the life of an MLC display owing to interaction with the inside surfaces of the display, a high (initial) resistance is very important for displays that have to have acceptable resistance values over a long operating period.

The disadvantages of the MLC-TN displays disclosed hitherto are their comparatively low contrast, the relatively high viewing-angle dependence and the difficulty of producing grey shades in these displays.

There thus continues to be a great demand for MLC displays having very high specific resistance at the same time as a large working-temperature range, short response times and a low threshold voltage with the aid of which various grey shades can be produced.

The invention has the object of providing MLC displays, in particular for monitor and TV applications, which are based on the ECB or IPS effect, do not have the disadvantages indicated above, or only do so to a lesser extent, and at the same time have very high specific resistance values. In particular, it must be ensured for monitors and televisions that they also work at extremely high and extremely low temperatures.

Surprisingly, it has now been found that this object can be achieved if nematic liquid-crystal mixtures which comprise at least one compound of the formula IA and at least one compound from the group of the compounds of the formulae IB, IC and ID are used in these display elements. Compounds of the formula IA are known, for example, from EP 0 969 071 B1, EP 1 362 839 A2, DE 199 27 627 A1, DE 101 57 674 A1. Compounds of the formula IB are known, for example, from GB 0 168 683 B1 and EP 0 122 389 B1. The compounds of the formula IC are known, for example, from WO 03/010120. The compounds of the formula ID are known, for example, from DE 10 204 236 and DE 39 06 040. The disclosures of these references for their disclosures of the compounds of formulae IA, IB, IC, and ID are incorporated herein by reference.

The invention thus relates to a liquid-crystalline medium based on a mixture of polar compounds which comprises at least one compound of the formula IA and at least one compound selected from the group of the compounds of the formulae IB, IC and ID.

The mixtures according to the invention exhibit very broad nematic phase ranges with clearing points ≧70° C., very favourable values for the capacitive threshold, relatively high values for the holding ratio and at the same time very good low-temperature stabilities at −30° C. and −40° C. as well as very low rotational viscosities and short response times. The mixtures according to the invention are furthermore distinguished by the fact that, in addition to the improvement in the rotational viscosity $\gamma_1$, an increase in the elastic constant $K_{33}$ contributes to the improvement in the response times.

Some preferred embodiments of the mixtures according to the invention are shown below:

a) $R^{1A}$ and $R^{1B}$ in the formulae IA and IB preferably denote alkenyl, in particular vinyl, 1E-alkenyl or 3E-alkenyl, and very particularly preferably $CH_2$=CH, $CH_3CH$=CH, $C_2H_5CH$=CH, $C_3H_7CH$=CH, $CH_2$=$CHC_2H_4$, $CH_3CH$=$CHC_2H_4$, $CH_2$=$CHCH_2$, $CH_3CH$=$CHCH_2$, $C_2H_5CH$=$CHCH_2$, $R^{1A}$ denotes in particular $CH_2$=CH. $R^{1B}$ denotes in particular $CH_3CH$=CH or $CH_2$=CH.

$R^{1C}$, $R^{1D}$ and $R^{2D}$ preferably denote straight-chain alkyl, in particular $CH_3$, $C_2H_5$, n-$C_3H_7$, n-$C_4H_9$, n-$C_5H_{11}$, furthermore n-$C_6H_{13}$, n-$C_7H_{15}$.

b) Liquid-crystalline medium which comprises one, two, three, four or more, preferably one, two or three, compounds of the formula IA.

c) Liquid-crystalline medium, where the proportion of compounds of the formula IA in the mixture as a whole is ≧5% by weight, preferably at least 10% by weight, particularly preferably ≧15% by weight.

The proportion of compounds of the formula IB in the mixture as a whole, if present, is preferably ≧5% by weight, in particular ≧10% by weight, very particularly preferably ≧20% by weight.

The proportion of compounds of the formula IC in the mixture as a whole, if present, is preferably ≧2% by weight, in particular ≧4% by weight, very particularly preferably ≧5% by weight.

The proportion of compounds of the formula ID in the mixture as a whole, if present, is preferably ≧4% by weight, in particular ≧8% by weight, very particularly preferably ≧10% by weight.

The total proportion of the compounds of the formulae IB, IC and/or ID in the mixture according to the invention is preferably ≧5% by weight, in particular ≧10% by weight and very particularly preferably ≧15% by weight.

d) Preferred compounds of the formula IA are the compounds of the formulae IA-1 to IA-54:

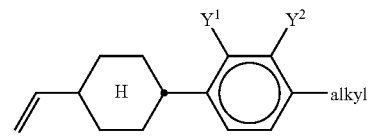
IA-1

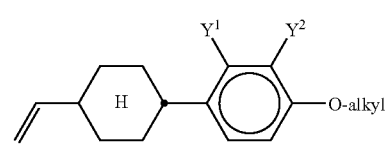
IA-2

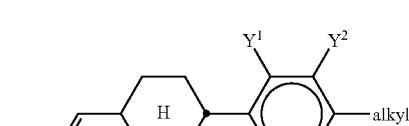
IA-3

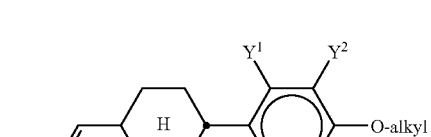
IA-4

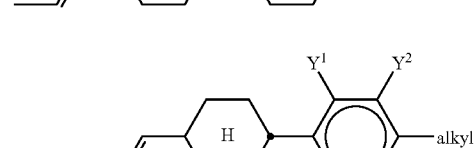
IA-5

IA-6

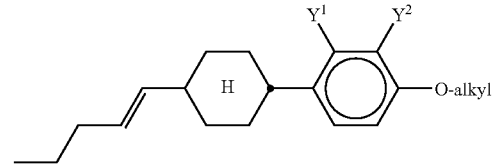
IA-7

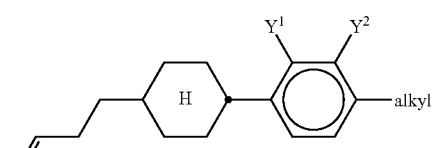
IA-8

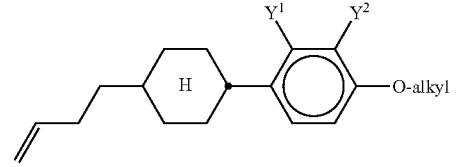
IA-9

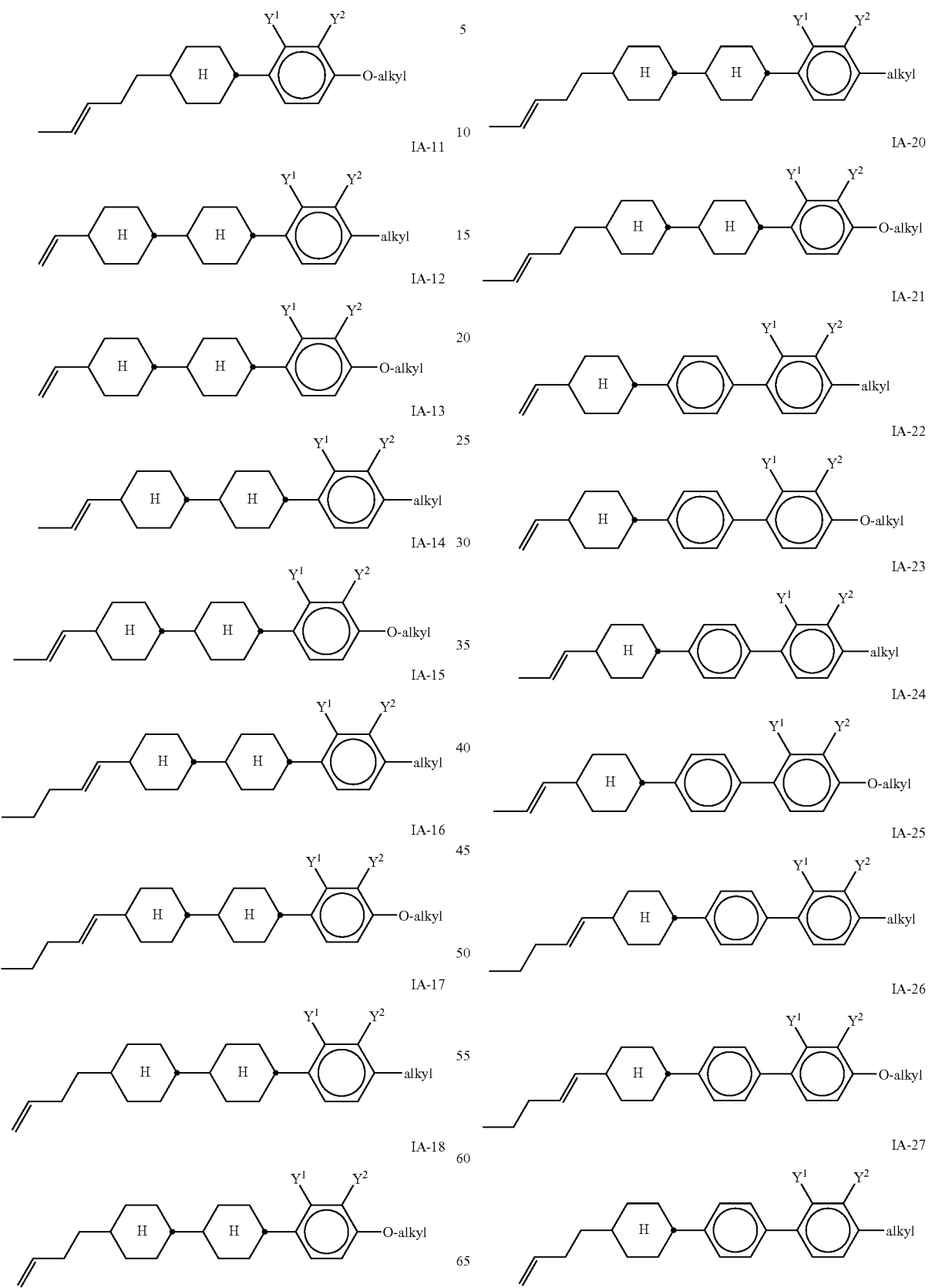

IA-28
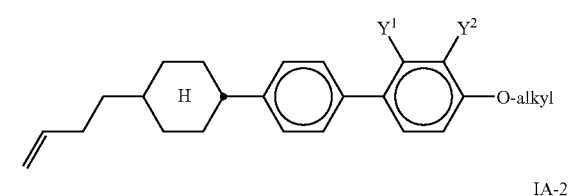
IA-29
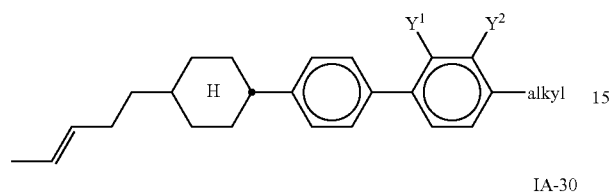
IA-30
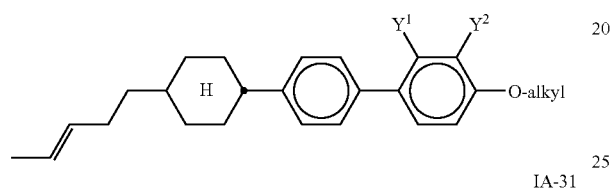
IA-31
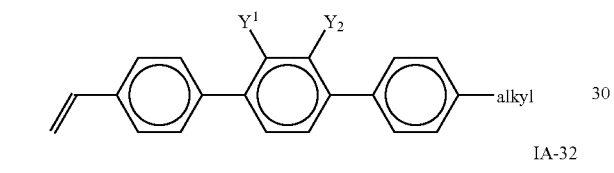
IA-32
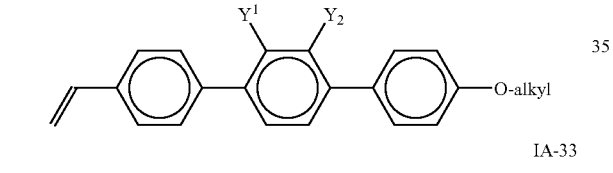
IA-33
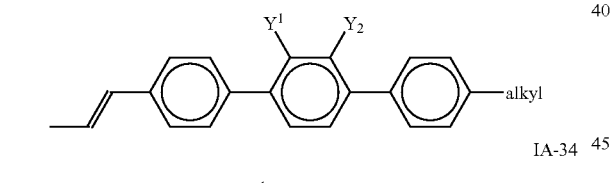
IA-34
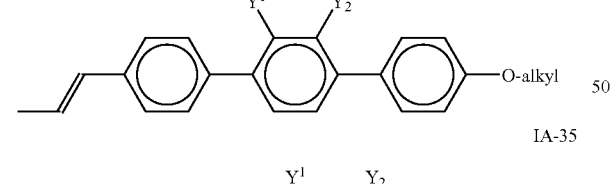
IA-35
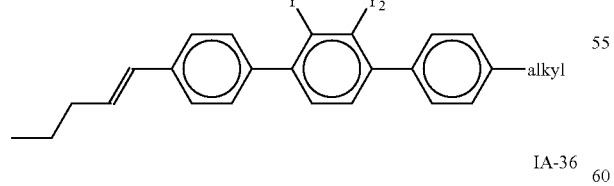
IA-36
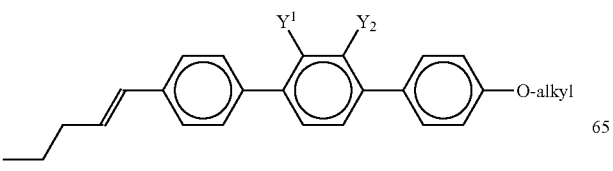
IA-37
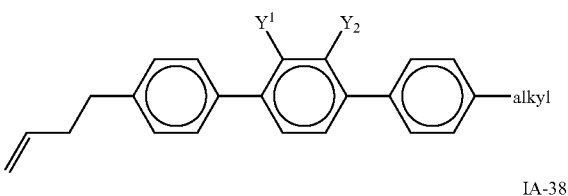
IA-38
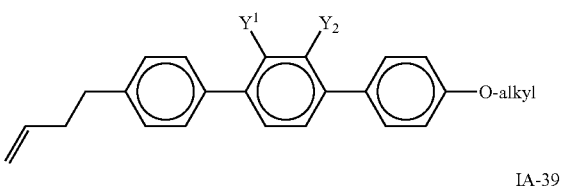
IA-39
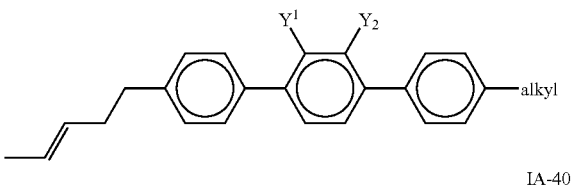
IA-40
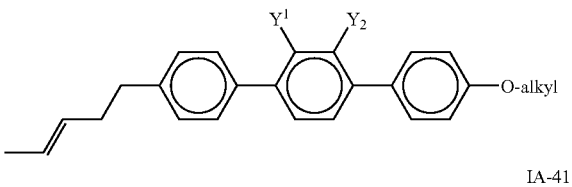
IA-41
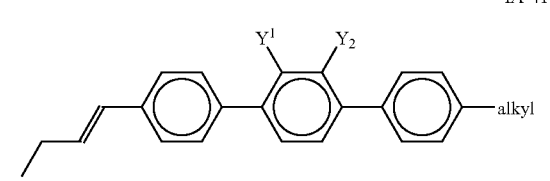
IA-42
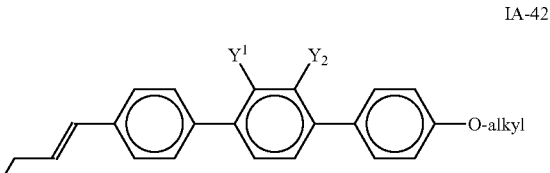
IA-43
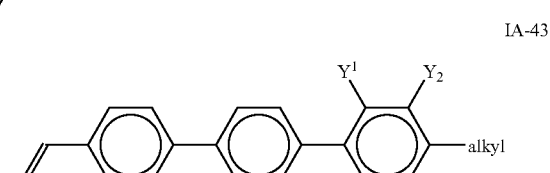
IA-44
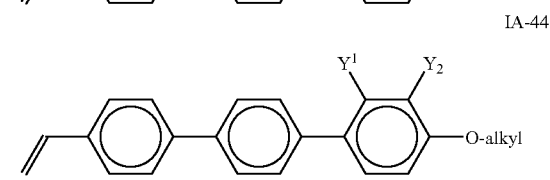
IA-45
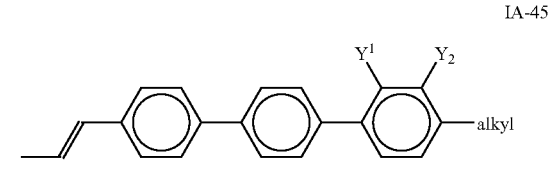

-continued

IA-46
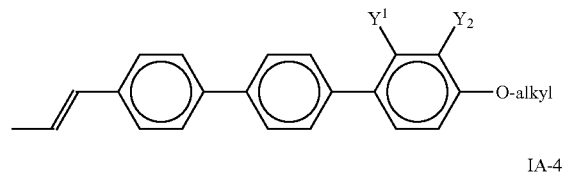

IA-47
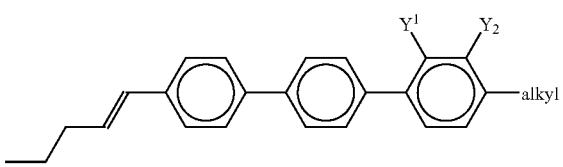

IA-48
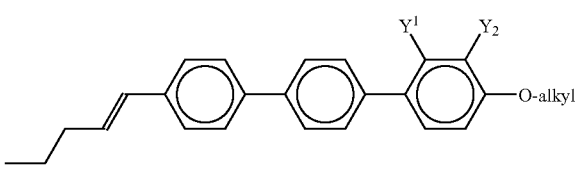

IA-49
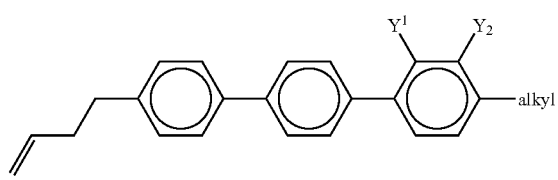

IA-50
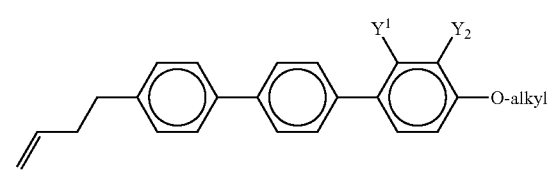

IA-51
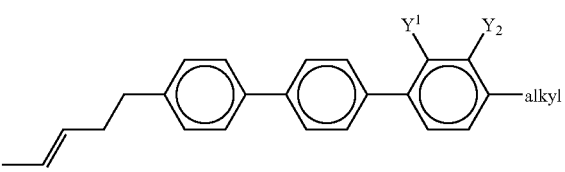

IA-53
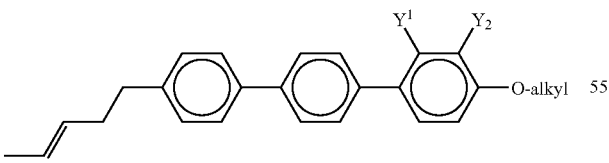

IA-54
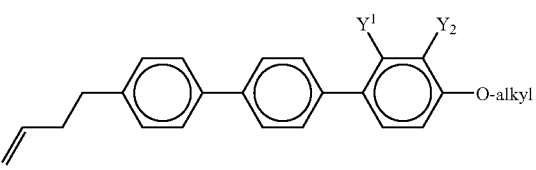

-continued

IA-55
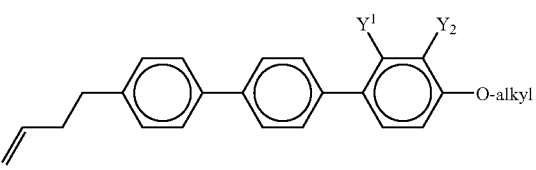

Alkyl denotes a straight-chain alkyl radical having 1-6 C atoms.

Particular preference is given to the compounds of the formulae IA-1, IA-2, IA-3, IA-4, IA-11, IA-12, IA-13 and IA-14.

In the compounds of the formula IA and the sub-formulae of the formulae IA-1 to IA-54, $Y^1$ and $Y^2$ preferably both denote fluorine and $Y^3$=H.

Preference is furthermore given to the following combinations:

$Y^1$=F, $Y^2$=Cl and $Y^3$=H $Y^1$=Cl, $Y^2$=F and $Y^3$=H

Preferred compounds of the formula IB are the compounds of the formulae IB-1 to IB-16:

IB-1
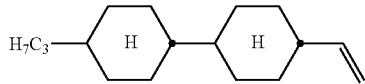

IB-2
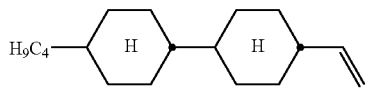

IB-3
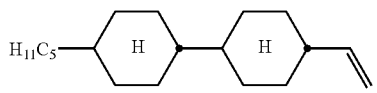

IB-4
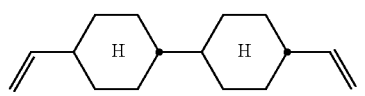

IB-5
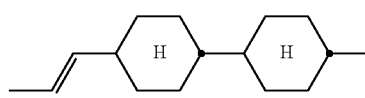

IB-6
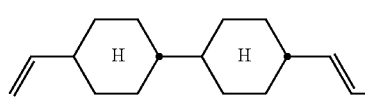

IB-7
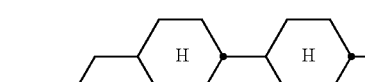

IB-8
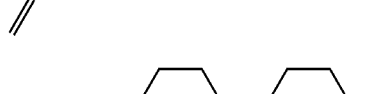

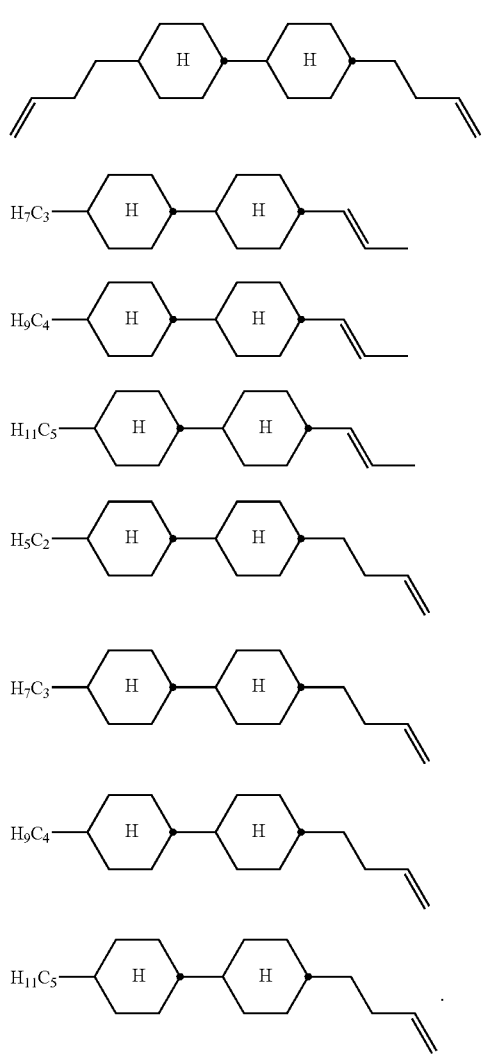
Preferred compounds of the formula IC are the compounds of the formulae IC-1 to IC-16:
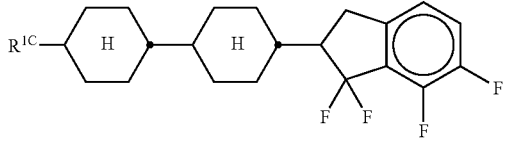
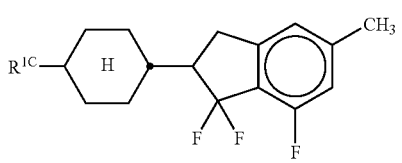
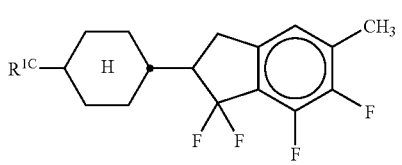
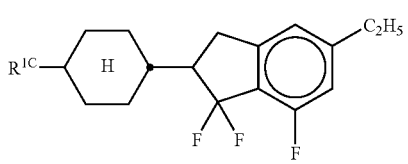
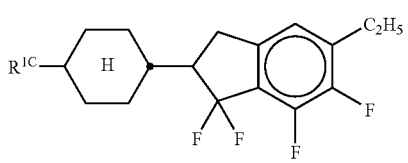
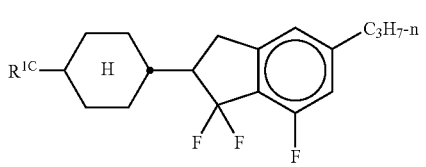
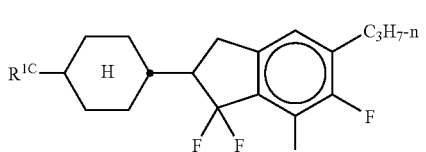
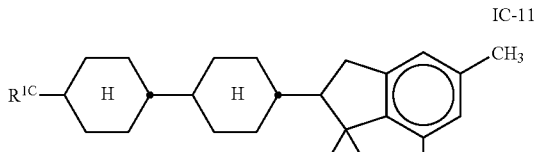
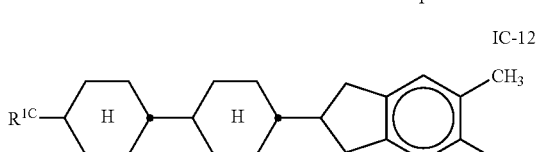

-continued

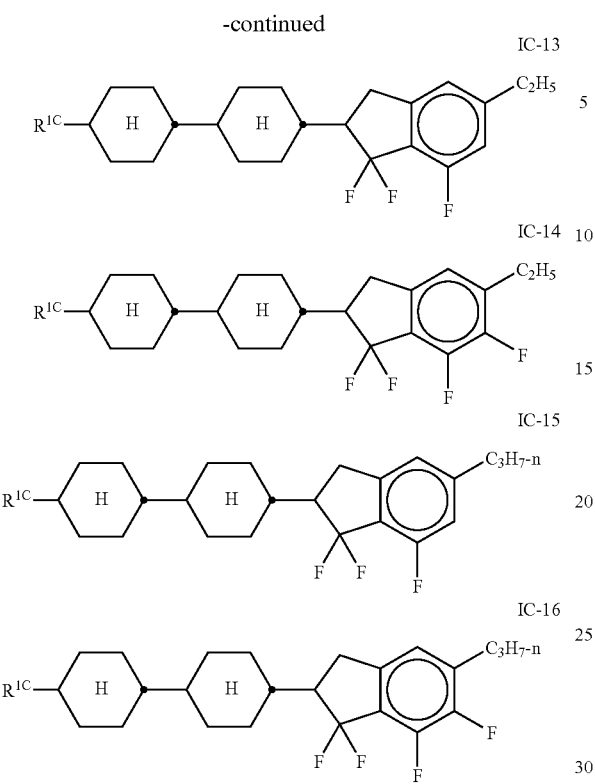

IC-13

IC-14

IC-15

IC-16 in which $R^{1C}$ preferably denotes straight-chain alkyl. Particular preference is given to the compound of the formula IC-3, furthermore IC-1 and IC-4.

Preferred compounds of the formula ID are the compounds of the formulae ID-1 to ID-6:

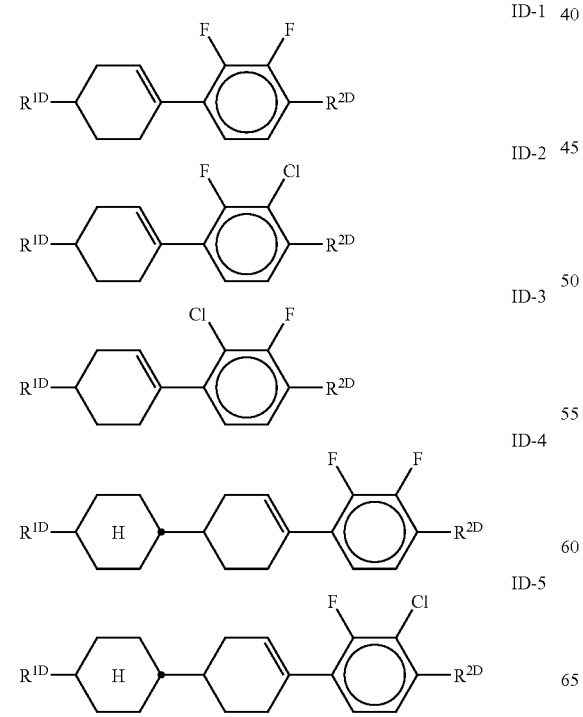

ID-1

ID-2

ID-3

ID-4

ID-5

-continued

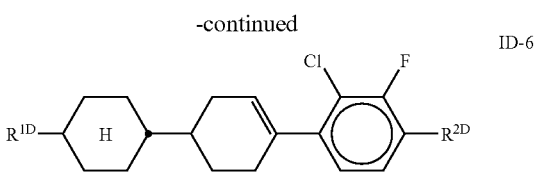

ID-6 in which $R^{1D}$ preferably denotes straight-chain alkyl having 1-7 C atoms and $R^{2D}$ preferably denotes straight-chain alkyl or alkoxy having 1-7 C atoms. Particular preference is given to the compounds of the formulae ID-1 and ID-4.

e) Liquid-crystalline medium which additionally comprises one or more compounds of the formulae IIA and/or IIB

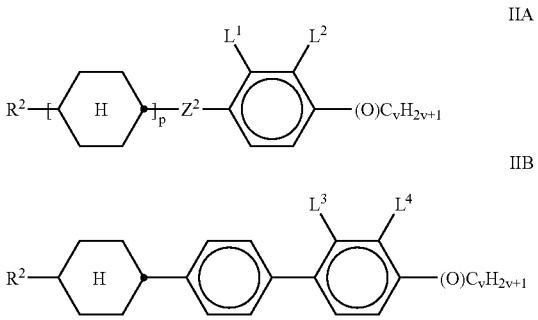

IIA

IIB in which $R^2$ denotes H, an alkyl radical having up to 15 C atoms which is unsubstituted, monosubstituted by CN or $CF_3$ or at least monosubstituted by halogen, where, in addition, one or more $CH_2$ groups in these radicals may be replaced by —O—, —S—,

—C≡C—, —$CF_2O$—, —$OCF_2$—, —OC-O— or —O—CO— in such a way that O atoms are not linked directly to one another, $L^{1-4}$ each, independently of one another, denote F or Cl, $Z^2$ denotes a single bond, —$CH_2CH_2$—, —CH═CH—, —CFO—, —$OCF_2$—, —$CH_2O$—, —$OCH_2$—, —COO—, —OCO—, —$C_2F_4$—, —CF═CF—, p denotes 1 or 2, and v denotes 1 to 6.

Preferred compounds of the formulae IIA and IIB are shown below.

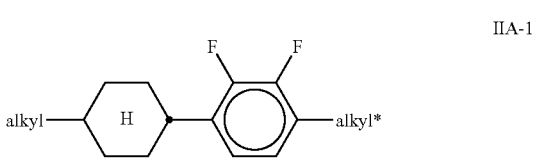

IIA-1

-continued
IIA-2
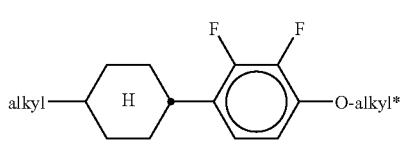
IIA-3
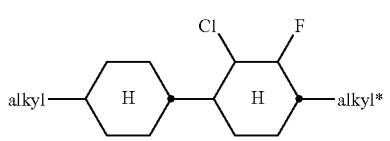
IIA-4
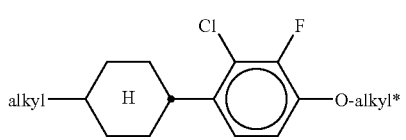
IIA-5
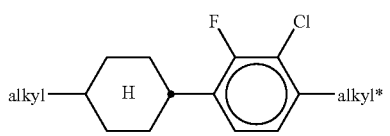
IIA-6
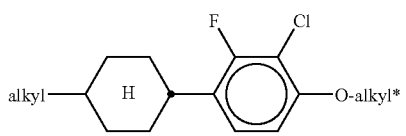
IIA-7
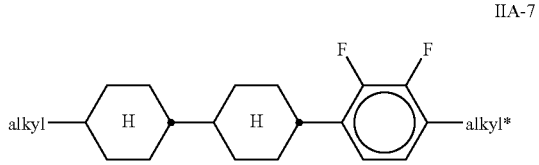
IIA-8
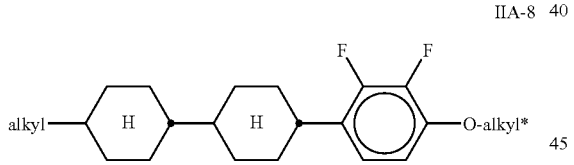
IIA-9
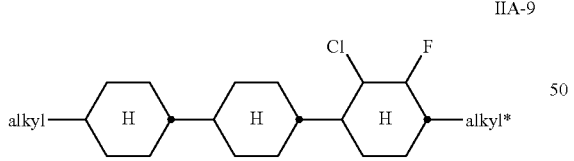
IIA-10
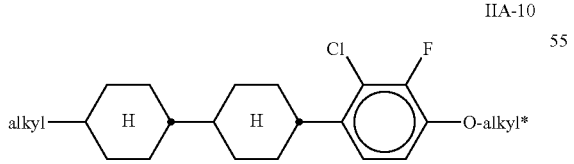
IIA-11
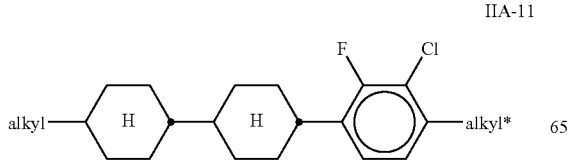
-continued
IIA-12
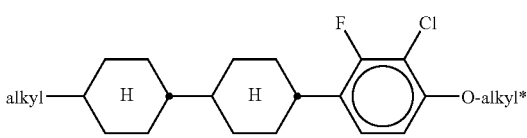
IIA-13
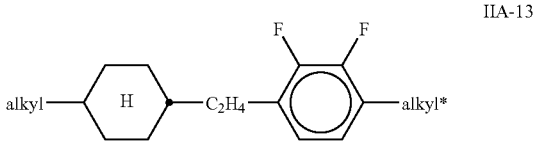
IIA-14
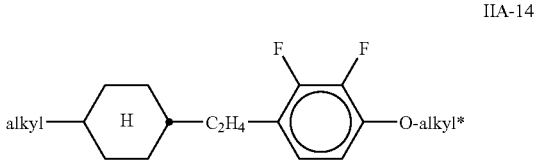
IIA-15
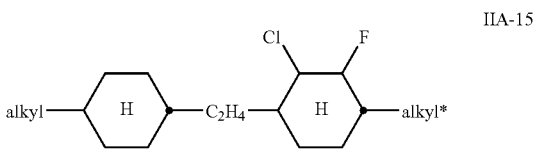
IIA-16
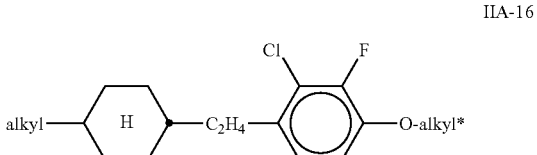
IIA-17
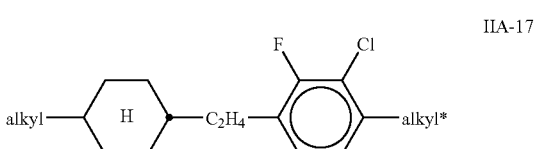
IIA-18
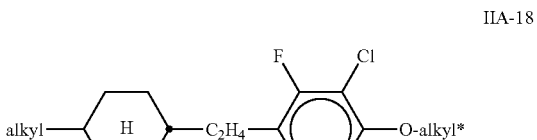
IIB-1
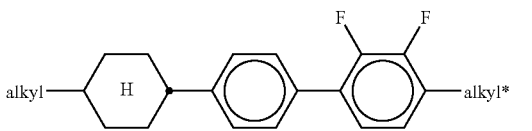
IIB-2
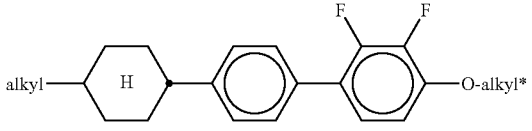
IIB-3
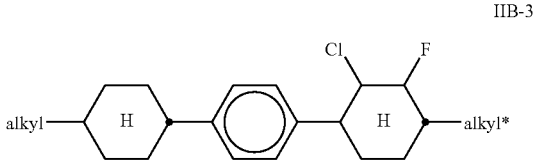

-continued

IIB-4
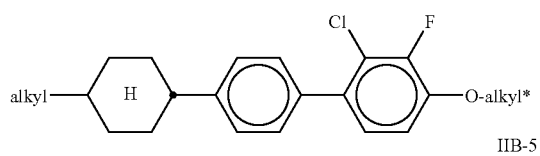

IIB-5
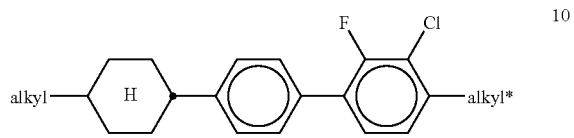

IIB-6
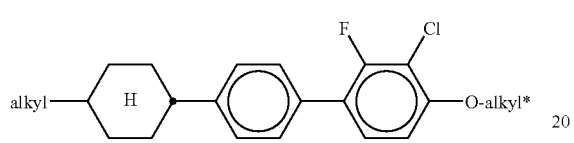

$R^2$ in the compounds of the formulae IIA and IIB preferably in each case denotes straight-chain alkyl having up to 6 C atoms, in particular $CH_3$, $C_2H_5$, n-$C_3H_7$, n-$C_4H_9$, n-$C_5H_{11}$. $L^{1-4}$ preferably each denote F.

f) Liquid-crystalline medium which additionally comprises one or more compounds of the formula III

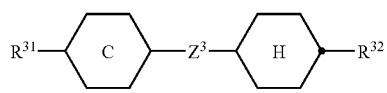
III in which $R^{31}$ and $R^{32}$ each, independently of one another, denote a straight-chain alkyl, alkoxyalkyl or alkoxy radical having up to 12 C atoms, and

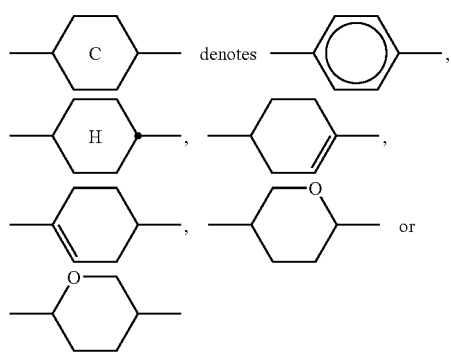

$Z^3$ denotes a single bond, —$CH_2CH_2$—, —CH═CH—, —$CF_2O$—, —$OCF_2$—, —$CH_2O$—, —$OCH_2$—, —COO—, —OCO—, —$C_2F_4$—, —CF═CF—.

g) Liquid-crystalline medium in which the proportion of compounds of the formulae IIA and/or IIB in the mixture as a whole is at least 20% by weight.

h) Liquid-crystalline medium in which the proportion of the compounds of the formula III in the mixture as a whole is at least 5% by weight.

i) Liquid-crystalline medium which additionally comprises one or more compounds selected from the formulae IIIa to IIIh:

IIIa
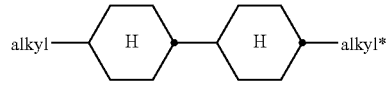

IIIb
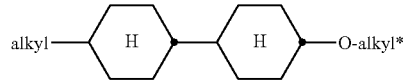

IIIc
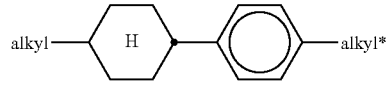

IIId
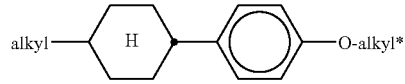

IIIe
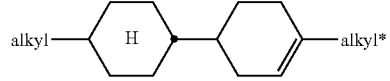

IIIf
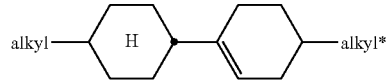

IIIg
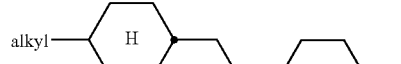

IIIh

in which alkyl and alkyl* each, independently of one another, denote a straight-chain alkyl radical having 1-6 C atoms.

The medium according to the invention preferably comprises at least one compound of the formula IIIa, formula IIIb and/or formula IIId.

j) Liquid-crystalline medium which comprises or consists of
5-80% by weight of one or more compounds of the formula IA in combination with at least one or more compounds selected from the group of the compounds of the formulae IB, IC and ID,
5-80% by weight of one or more compounds of the formulae IIA and/or IIB,
where the total amount of the compounds of the formulae IA, IB, IC, ID and IIA and/or IIB is ≦100% by weight.

k) Liquid-crystalline medium which additionally comprises one or more tetracyclic compounds of the formulae

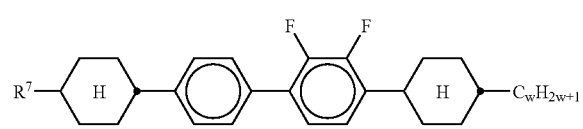

-continued

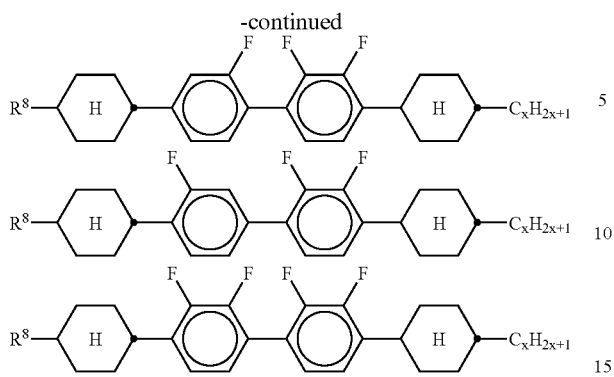

in which
R$^7$ and R$^8$ each, independently of one another, have one of the meanings indicated for R$^2$ in Claim 2, and
w and x each, independently of one another, denote 1 to 6.

l) Liquid-crystalline medium which additionally comprises one or more compounds of the formulae Y-1 to Y-8

Y-1
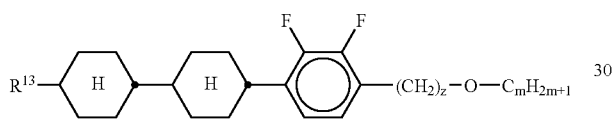

Y-2
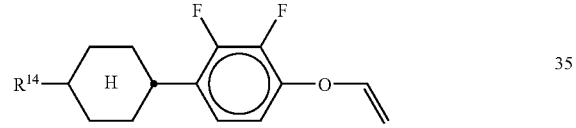

Y-3
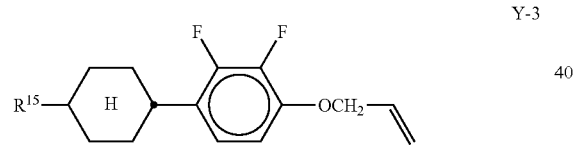

Y-4
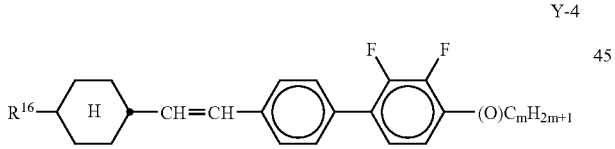

Y-5
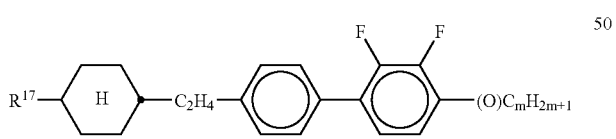

Y-6
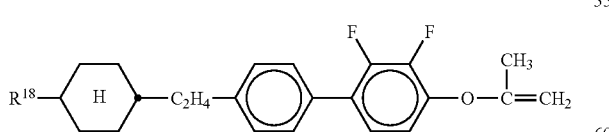

Y-7
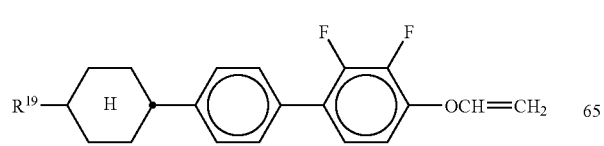

-continued

Y-8
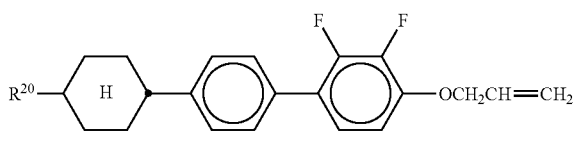

in which R$^{13}$-R$^{20}$ each, independently of one another, denote an alkyl or alkoxy radical having 1-6 C atoms; z and m each, independently of one another, denote 1-6.

The medium according to the invention particularly preferably comprises one or more compounds of the formulae Y-1 to Y-8 in amounts of ≧5% by weight.

m) Liquid-crystalline medium which additionally comprises one or more compounds of the formula

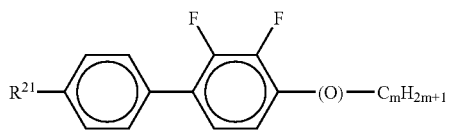

preferably in amounts of >3% by weight, in particular ≧5% by weight, and very particularly preferably 5-25% by weight,
where
R$^{21}$ denotes alkyl or alkoxy having 1-7 C atoms and
m denotes 1-6.

n) Liquid-crystalline medium additionally comprising one or more fluorinated terphenyls of the formulae T-1 to T-22

T-1
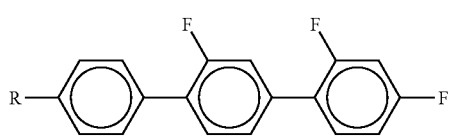

T-2
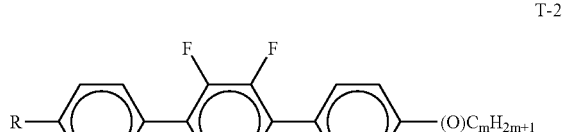

T-3
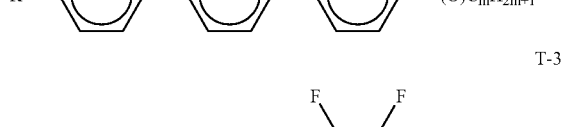

T-4
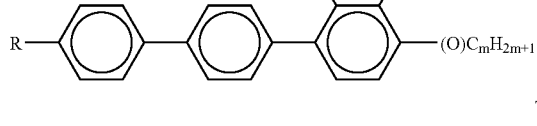

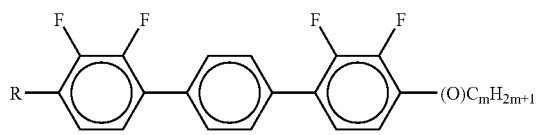

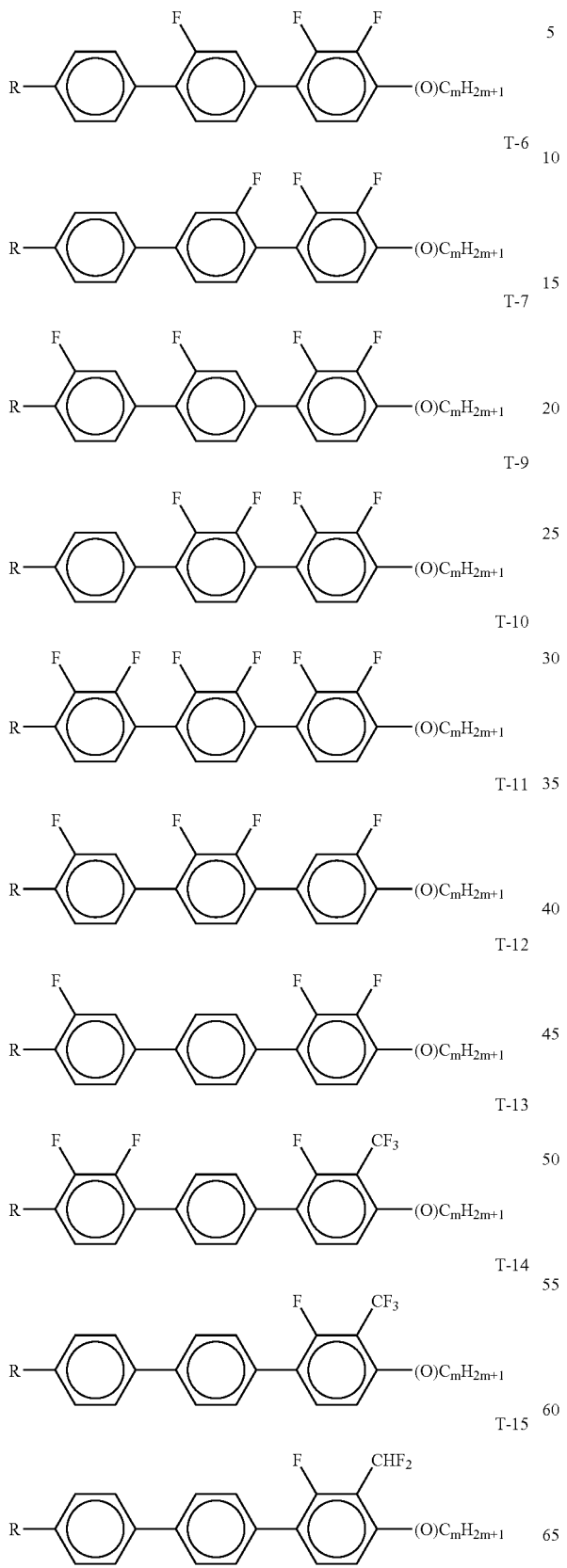
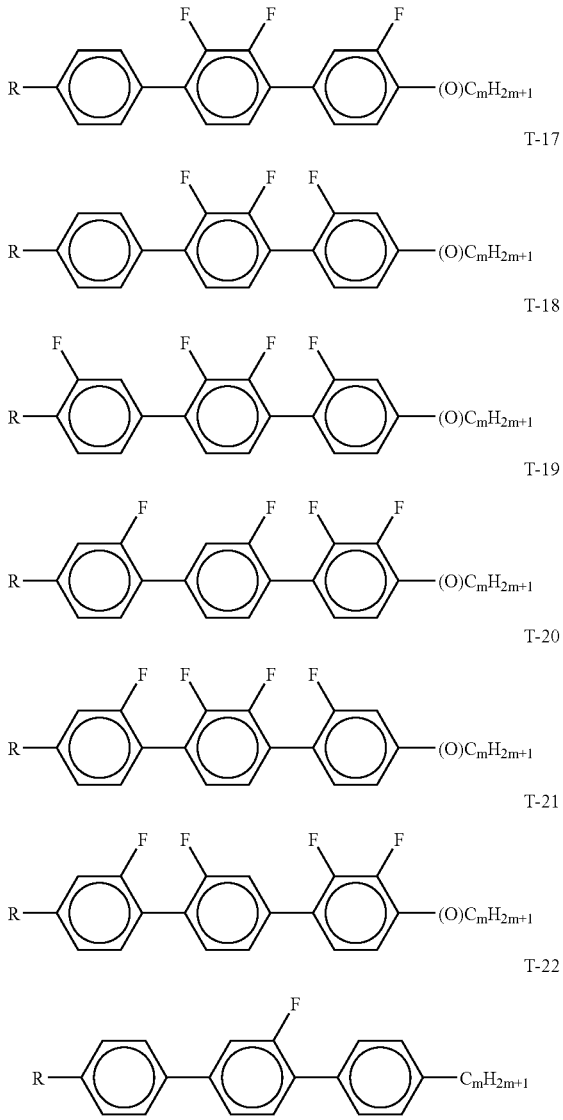

in which
R denotes a straight-chain alkyl or alkoxy radical having 1-7 C atoms
and
m denotes 1-6.
R preferably denotes methyl, ethyl, propyl, butyl, pentyl, hexyl, methoxy, ethoxy, propoxy, butoxy, pentoxy.
The medium according to the invention preferably comprises the terphenyls of the formulae T-1 to T-22 in amounts of 2-30% by weight, in particular 5-20% by weight.
Particular preference is given to compounds of the formulae T-1, T-2, T-3 and T-22. In these compounds, R preferably denotes alkyl, furthermore alkoxy, each having 1-5 C atoms.
The terphenyls are preferably employed in the mixtures according to the invention if the Δn value of the mixture is intended to be ≧0.1. Preferred mixtures comprise 2-20% by weight of one or more terphenyl compounds selected from the group of the compounds T-1 to T-22.

o) Liquid-crystalline medium additionally comprising one or more biphenyls of the formulae B-1 to B-3,

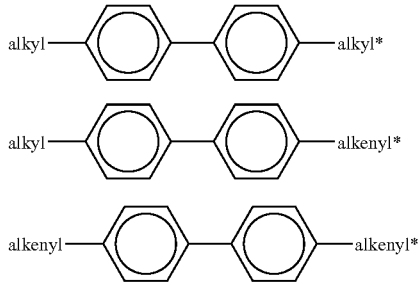

in which alkyl and alkyl* each, independently of one another, denote a straight-chain alkyl radical having 1-6 C atoms, and alkenyl and alkenyl* each, independently of one another, denote a straight-chain alkenyl radical having 2-6 C atoms.

The proportion of the biphenyls of the formulae B-1 to B-3 in the mixture as a whole is preferably at least 3% by weight, in particular ≧5% by weight.

Of the compounds of the formulae B-1 to B-3, particular preference is given to the compounds of the formula B-2.

Particularly preferred biphenyls are

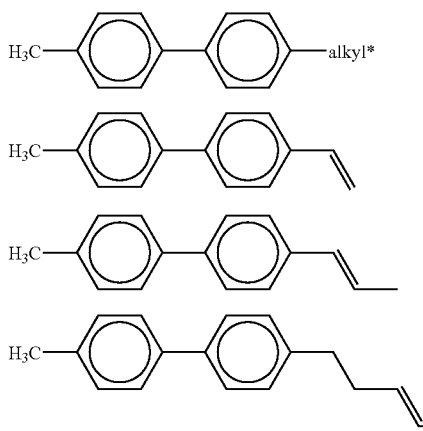

in which alkyl* denotes an alkyl radical having 1-6 C atoms. The medium according to the invention particularly preferably comprises one or more compounds of the formulae B-1a and/or B-2c.

p) Liquid-crystalline medium comprising at least one compound of the formulae Z-1 to Z-16

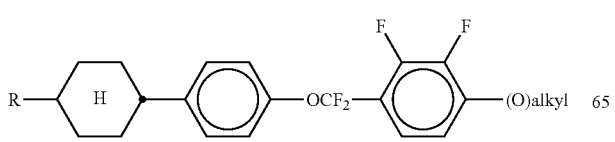

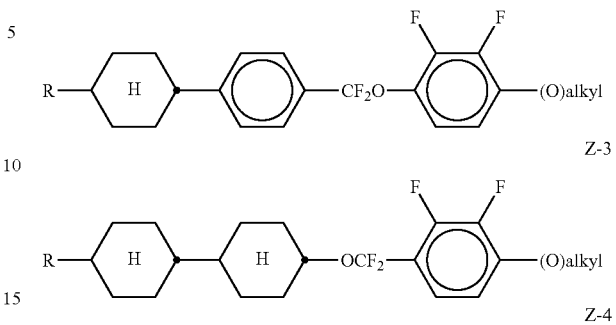

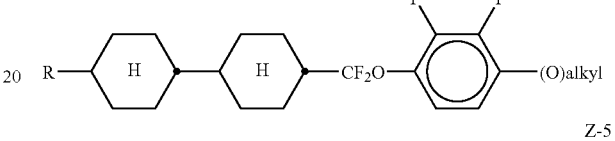

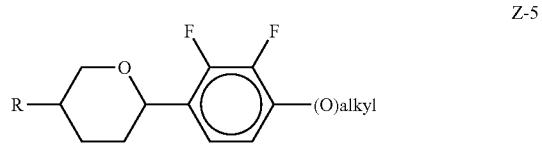

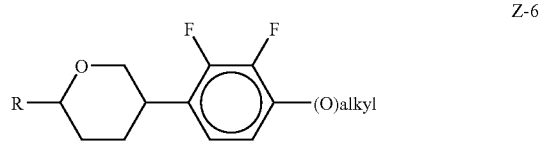

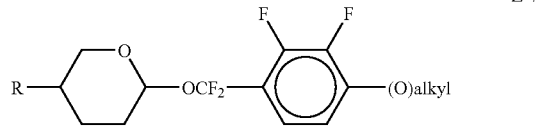

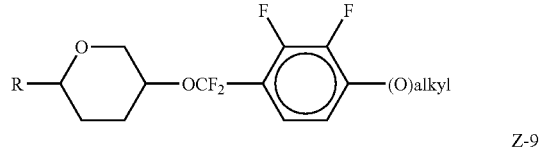

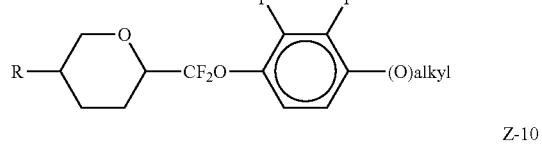

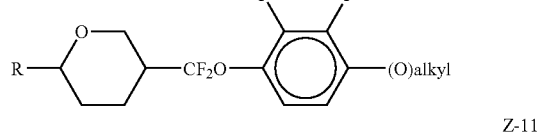

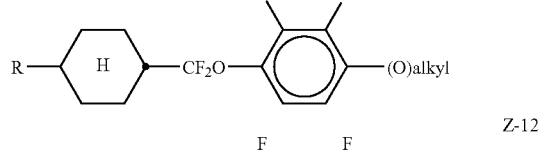

-continued

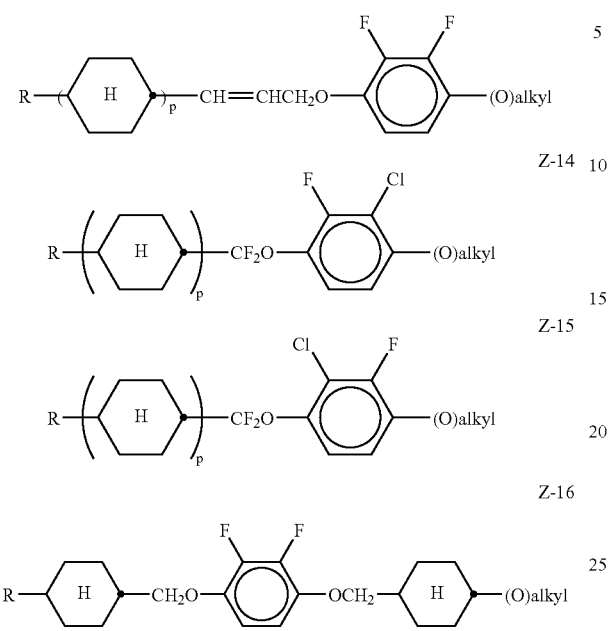

in which R and alkyl have the meanings indicated above.

q) Liquid-crystalline medium comprising at least one compound of the formulae O-1 to O-13

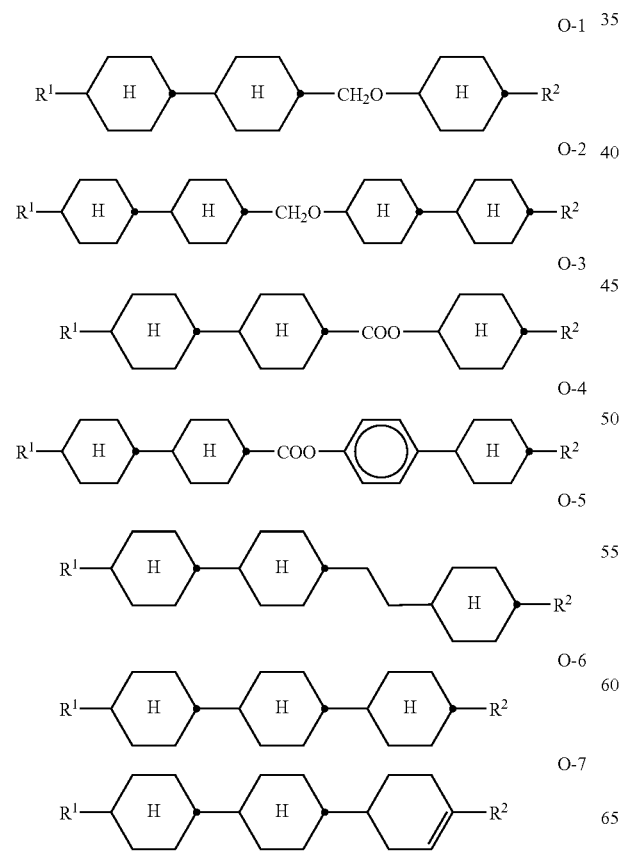

-continued

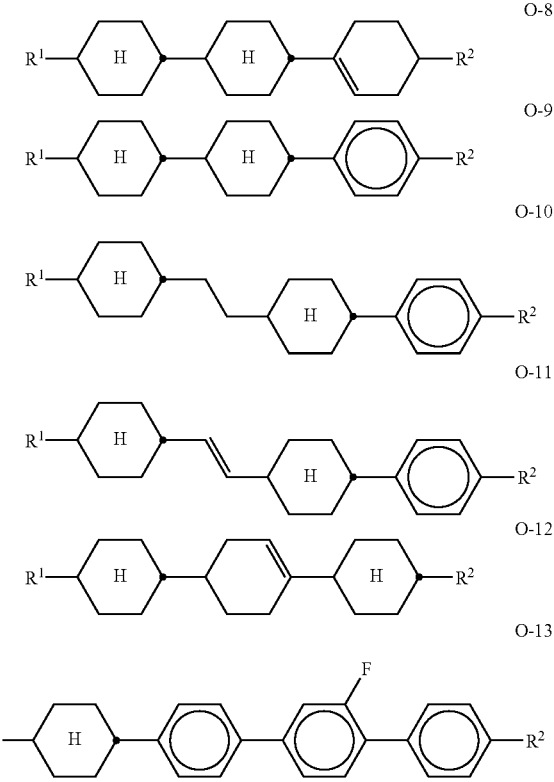

in which $R^1$ and $R^2$ have the meanings indicated for $R^{2A}$, $R^1$ and $R^2$ each, independently of one another, preferably denote straight-chain alkyl, furthermore alkenyl.

Preferred media comprise one or more compounds of the formulae O-1, O-3, O-4, O-9 and/or O-13.

r) Preferred liquid-crystalline media according to the invention comprise one or more substances which contain a tetrahydronaphthyl or naphthyl unit, such as, for example, the compounds of the formulae N-1 to N-5

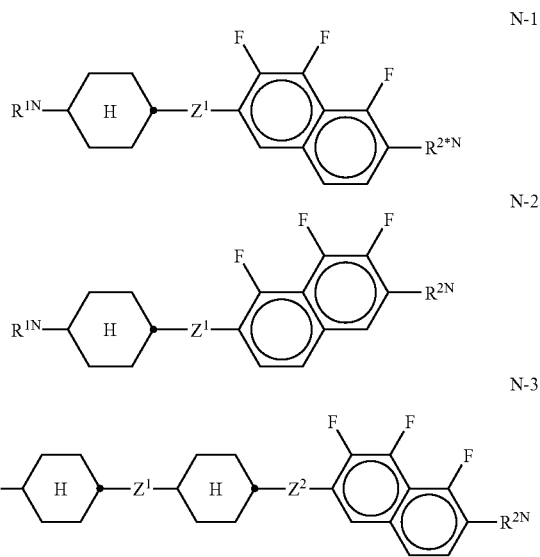

-continued

N-4

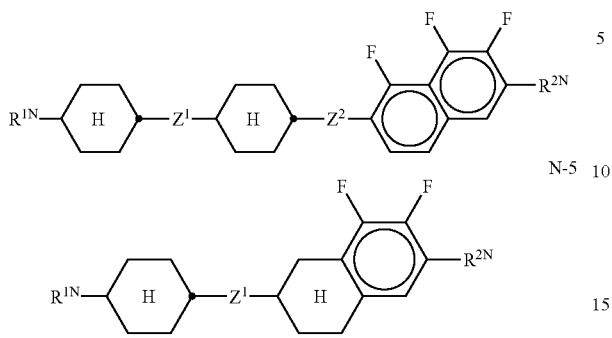

N-5 in which R$^{1N}$ and R$^{2N}$ each, independently of one another, have the meanings indicated for R$^{2A}$, preferably denote straight-chain alkyl, straight-chain alkoxy or straight-chain alkenyl, and Z, Z$^1$ and Z$^2$ each, independently of one another, denote —C$_2$H$_4$—, —CH=CH—, —(CH$_2$)$_4$—, —(CH$_2$)$_3$O—, —O(CH$_2$)$_3$—, —CH=CHCH$_2$CH$_2$—, —CH$_2$CH$_2$CH=CH—, —CH$_2$O—, —OCH$_2$—, —COO—, —OCO—, —C$_2$F$_4$—, —CF=CF—, —CF=CH—, —CH=CF—, —CF$_2$O—, —OCF$_2$—, —CH$_2$— or a single bond.

s) Preferred mixtures comprise one or more difluorodibenzochroman compounds of the formula BC and/or chromans of the formula CR

BC

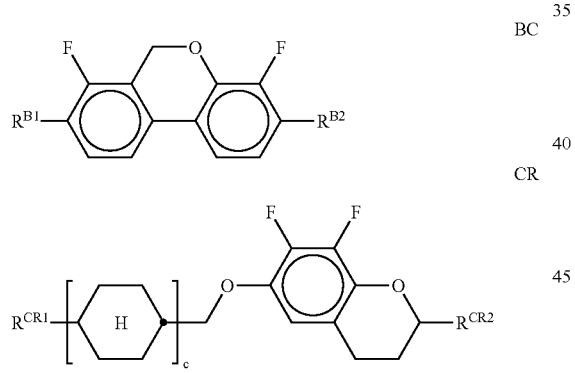

CR in which

R$^{B1}$, R$^{B2}$, R$^{CR1}$ and R$^{CR2}$ each, independently of one another, have the meaning of R$^{2A}$. The mixtures according to the invention preferably comprise the compounds of the formulae BC and/or CR in amounts of 3 to 20% by weight, in particular in amounts of 3 to 15% by weight.

Particularly preferred compounds of the formulae BC and CR are the compounds BC-1 to BC-7 and CR-1 to CR-5

BC-1

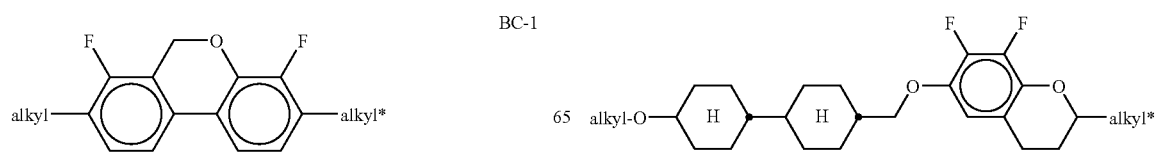

BC-2

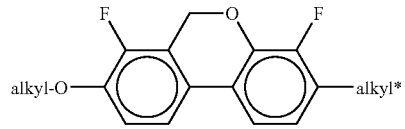

BC-3

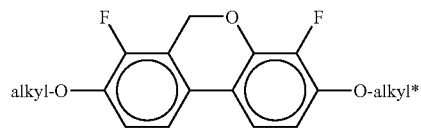

BC-4

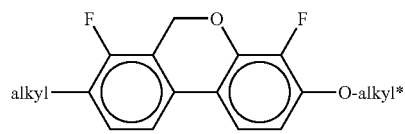

BC-5

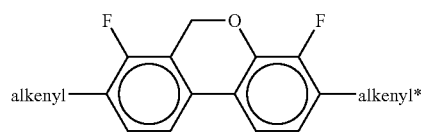

BC-6

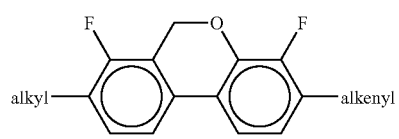

BC-7

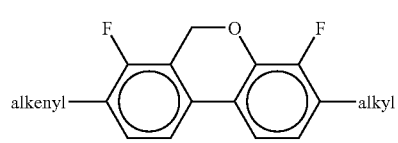

CR-1

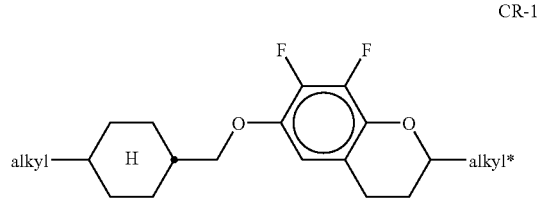

CR-2

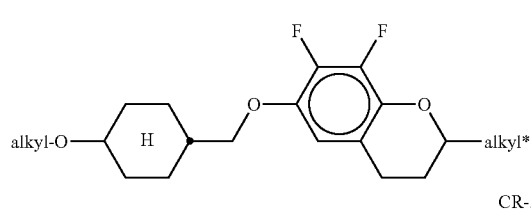

CR-3

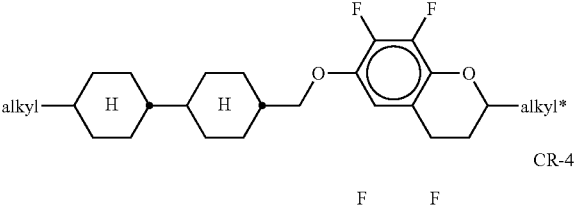

CR-4

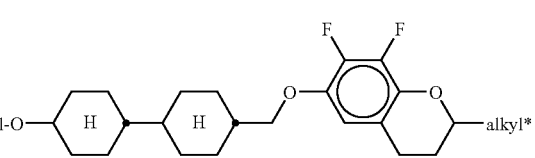

-continued

CR-5

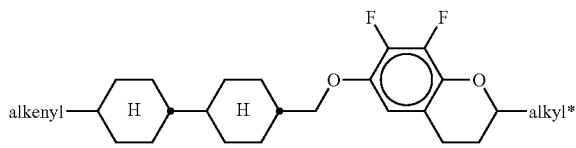

in which alkyl and alkyl* each, independently of one another, denote a straight-chain alkyl radical having 1-6 C atoms, and alkenyl and alkenyl* each, independently of one another, denote a straight-chain alkenyl radical having 2-6 C atoms.

Very particularly preferred mixtures comprise one, two or three compounds of the formula BC-2.

The invention furthermore relates to an electro-optical display having active-matrix addressing based on the ECB or FFS effect, characterized in that it contains, as dielectric, a liquid-crystalline medium according to one or more of Claims 1 to 10.

The liquid-crystalline medium according to the invention preferably has a nematic phase from $\leq -20°$ C. to $\geq 70°$ C., particularly preferably from $\leq -30°$ C. to $\geq 80°$ C., very particularly preferably from $\leq -40°$ C. to $\geq 90°$ C.

The term "have a nematic phase" here means on the one hand that no smectic phase and no crystallization are observed at low temperatures at the corresponding temperature and on the other hand that clearing does not occur on heating from the nematic phase. The investigation at low temperatures is carried out in a flow viscometer at the corresponding temperature and is checked by storage in test cells having a layer thickness corresponding to the electro-optical application for at least 100 hours.

If the storage stability at a temperature of $-20°$ C. in a corresponding test cell is 1000 h or more, the medium is regarded as stable at this temperature. At temperatures of $-30°$ C. and $-40°$ C., the corresponding times are 500 h and 250 h respectively. At high temperatures, the clearing point is measured by conventional methods in capillaries.

The liquid-crystal mixture preferably has a nematic phase range of at least 60 K and a flow viscosity $v_{20}$ of at most 30 mm$^2$·s$^{-1}$ at 20° C.

The values of the birefringence An in the liquid-crystal mixture are generally between 0.07 and 0.16, preferably between 0.08 and 0.12.

The liquid-crystal mixture according to the invention has a $\Delta\in$ of $-0.5$ to $-8.0$, in particular $-3.0$ to $-6.0$, where $\Delta\in$ denotes the dielectric anisotropy. The rotational viscosity $\gamma_1$ at 20° C. is preferably $\leq 150$ mpa·s, in particular $\leq 120$ mPa·s.

The liquid-crystal media according to the invention have relatively low values for the threshold voltage ($V_0$). They are preferably in the range from 1.7 V to 2.5 V, particularly preferably $\leq 2.4$ V and very particularly preferably $\leq 2.2$ V.

For the present invention, the term "threshold voltage" relates to the capacitive threshold ($V_0$), also known as the Freedericksz threshold, unless explicitly indicated otherwise.

In addition, the liquid-crystal media according to the invention have high values for the voltage holding ratio in liquid-crystal cells.

In general, liquid-crystal media having a low addressing voltage or threshold voltage exhibit a lower voltage holding ratio than those having a greater addressing voltage or threshold voltage and vice versa.

For the present invention, the term "dielectrically positive compounds" denotes compounds having a $\Delta\in>1.5$, the term "dielectrically neutral compounds" denotes those having $-1.5\leq\Delta\in\leq 1.5$ and the term "dielectrically negative compounds" denotes those having $\Delta\in<-1.5$. The dielectric anisotropy of the compounds is determined here by dissolving 10% of the compounds in a liquid-crystalline host and determining the capacitance of the resultant mixture in at least one test cell in each case having a layer thickness of 20 µm with homeotropic and with homogeneous surface alignment at 1 kHz. The measurement voltage is typically 0.5 V to 1.0 V, but is always lower than the capacitive threshold of the respective liquid-crystal mixture investigated.

The host mixture used for dielectrically positive and dielectrically neutral compounds is ZLI-4792 and the host mixture used for dielectrically negative compounds is ZLI-2857, both from Merck KGaA, Germany. The values for the respective compounds to be investigated are obtained from the change in the dielectric constants of the host mixture after addition of the compound to be investigated and extrapolation to 100% of the compound employed. 10% of the compound to be investigated are dissolved in the host mixture. If the solubility of the substance is too low for this, the concentration is halved in steps until the investigation can be carried out at the desired temperature.

All temperature values indicated for the present invention are in ° C.

The voltage holding ratio is determined in test cells produced at Merck KGaA. The measurement cells have soda-lime glass substrates and are produced with polyimide alignment layers (AL-3046 from Japan Synthetic Rubber, Japan). The layer thickness is uniformly 6.0 µm. The area of the transparent ITO electrodes is 1 cm$^2$.

The mixtures according to the invention are suitable for all VA-TFT applications, such as, for example, VAN, MVA, (S)-PVA and ASV. They are furthermore suitable for IPS (in-plane switching), FFS (fringe field switching) and PALC applications of negative $\Delta\in$.

The nematic liquid-crystal mixtures in the displays according to the invention generally comprise two components A and B, which themselves consist of one or more individual compounds.

Component A has significantly negative dielectric anisotropy and gives the nematic phase a dielectric anisotropy of $\leq -0.5$. Besides one or more compounds of the formula IA, it preferably comprises one or more compounds of the formulae IC, ID, IIA, IIB.

The proportion of component A is preferably between 45 and 100%, in particular between 60 and 100%.

For component A, one (or more) individual compound(s) which has (have) a value of $\Delta\in$ of $\leq -0.8$ is (are) preferably selected. This value must be more negative, the smaller the proportion A in the mixture as a whole.

Component B has pronounced nematogeneity and a flow viscosity of not greater than 30 mm$^2$·s$^{-1}$, preferably not greater than 25 mm$^2$·s$^{-1}$, at 20° C.

Particularly preferred individual compounds in component B are extremely low-viscosity nematic liquid crystals having a flow viscosity of not greater than 18 mm$^2$·s$^{-1}$, preferably not greater than 12 mm$^2$·s$^{-1}$, at 20° C.

Component B is monotropically or enantiotropically nematic, has no smectic phases and is able to prevent the occurrence of smectic phases down to very low temperatures in liquid-crystal mixtures. For example, if various materials of high nematogeneity are added to a smectic liquid-crystal mixture, the nematogeneity of these materials can be compared through the degree of suppression of smectic phases that is achieved.

A multiplicity of suitable materials is known to the person skilled in the art from the literature. Particular preference is given to compounds of the formula III.

In addition, these liquid-crystal phases may also comprise more than 18 components, preferably 18 to 25 components.

The phases preferably comprise 4 to 15, in particular 5 to 12, and particularly preferably <10, compounds of the formulae IA, IB, IC, ID, IIA and/or IIB and optionally III.

Besides compounds of the formulae IA, IB, IC, ID, IIA and/or IIB and III, other constituents may also be present, for example in an amount of up to 45% of the mixture as a whole, but preferably up to 35%, in particular up to 10%.

The other constituents are preferably selected from nematic or nematogenic substances, in particular known substances, from the classes of the azoxybenzenes, benzylideneanilines, biphenyls, terphenyls, phenyl or cyclohexyl benzoates, phenyl or cyclohexyl cyclohexanecarboxylates, phenylcyclohexanes, cyclohexylbiphenyls, cyclohexylcyclohexanes, cyclohexylnaphthalenes, 1,4-biscyclohexylbiphenyls or cyclohexylpyrimidines, phenyl- or cyclohexyldioxanes, optionally halogenated stilbenes, benzyl phenyl ethers, tolans and substituted cinnamic acid esters.

The most important compounds which are suitable as constituents of liquid-crystal phases of this type can be characterized by the formula IV $R^9$-L-G-E-$R^{10}$  IV in which L and E each denote a carbo- or heterocyclic ring system from the group formed by 1,4-disubstituted benzene and cyclohexane rings, 4,4'-disubstituted biphenyl, phenylcyclohexane and cyclohexylcyclohexane systems, 2,5-disubstituted pyrimidine and 1,3-dioxane rings, 2,6-disubstituted naphthalene, di- and tetrahydronaphthalene, quinazoline and tetrahydroquinazoline, G denotes —CH=CH— —N(O)=N—
—CH=CQ- —CH=N(O)—
—C≡C— —CH$_2$—CH$_2$—
—CO—O— —CH$_2$—O—
—CO—S— —CH$_2$—S—
—CH=N— —COO-Phe-COO—
—CF$_2$O— —CF=CF—
—OCF$_2$— —OCH$_2$—
—(CH$_2$)$_4$— —(CH$_2$)$_3$O— or a C—C single bond, Q denotes halogen, preferably chlorine, or —CN, and $R^9$ and $R^{10}$ each denote alkyl, alkenyl, alkoxy, alkoxyalkyl or alkoxycarbonyloxy having up to 18, preferably up to 8, carbon atoms, or one of these radicals alternatively denotes CN, NC, NO$_2$, NCS, CF$_3$, SF$_5$, OCF$_3$, F, Cl or Br.

In most of these compounds, $R^9$ and $R^{10}$ are different from one another, one of these radicals usually being an alkyl or alkoxy group. Other variants of the proposed substituents are also common. Many such substances or also mixtures thereof are commercially available. All these substances can be prepared by methods known from the literature.

It goes without saying for the person skilled in the art that the VA, IPS, FFS or PALC mixture according to the invention may also comprise compounds in which, for example, H, N, O, Cl and F have been replaced by the corresponding isotopes.

Polymerizable compounds, so-called reactive mesogens (RMs), for example as disclosed in U.S. Pat. No. 6,861,107, may furthermore be added to the mixtures according to the invention in concentrations of preferably 0.12-5% by weight, particularly preferably 0.2-2%, based on the mixture. Mixtures of this type can be used for so-called polymer-stabilized VA modes, in which polymerization of the reactive mesogens is intended to take place in the liquid-crystalline mixture. The prerequisite for this is that the liquid-crystal mixture does not itself comprise any polymerizable components, such as, for example, compounds containing alkenyl side chains.

The construction of the liquid-crystal displays according to the invention corresponds to the usual geometry, as described, for example, in EP-A 0 240 379.

The following examples are intended to explain the invention without limiting it. Above and below, percentages denote per cent by weight; all temperatures are indicated in degrees Celsius.

Besides the compounds of the formula IA and one or more compounds from the group of the compounds of the formulae IB, IC and ID, the mixtures according to the invention preferably comprise one or more of the compounds shown below.

The following abbreviations are used:

(n, m, z: each, independently of one another, 1, 2, 3, 4, 5 or 6)

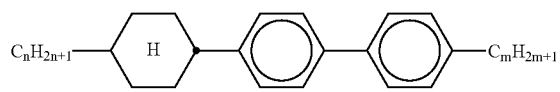

BCH-nm

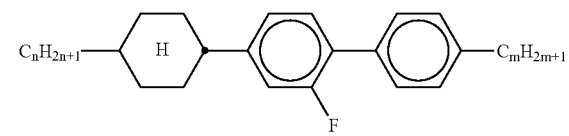

BCH-nmF

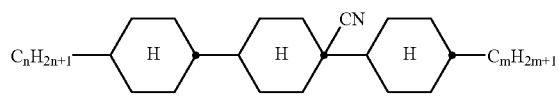

BCN-nm

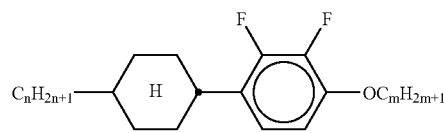

CY-n-Om

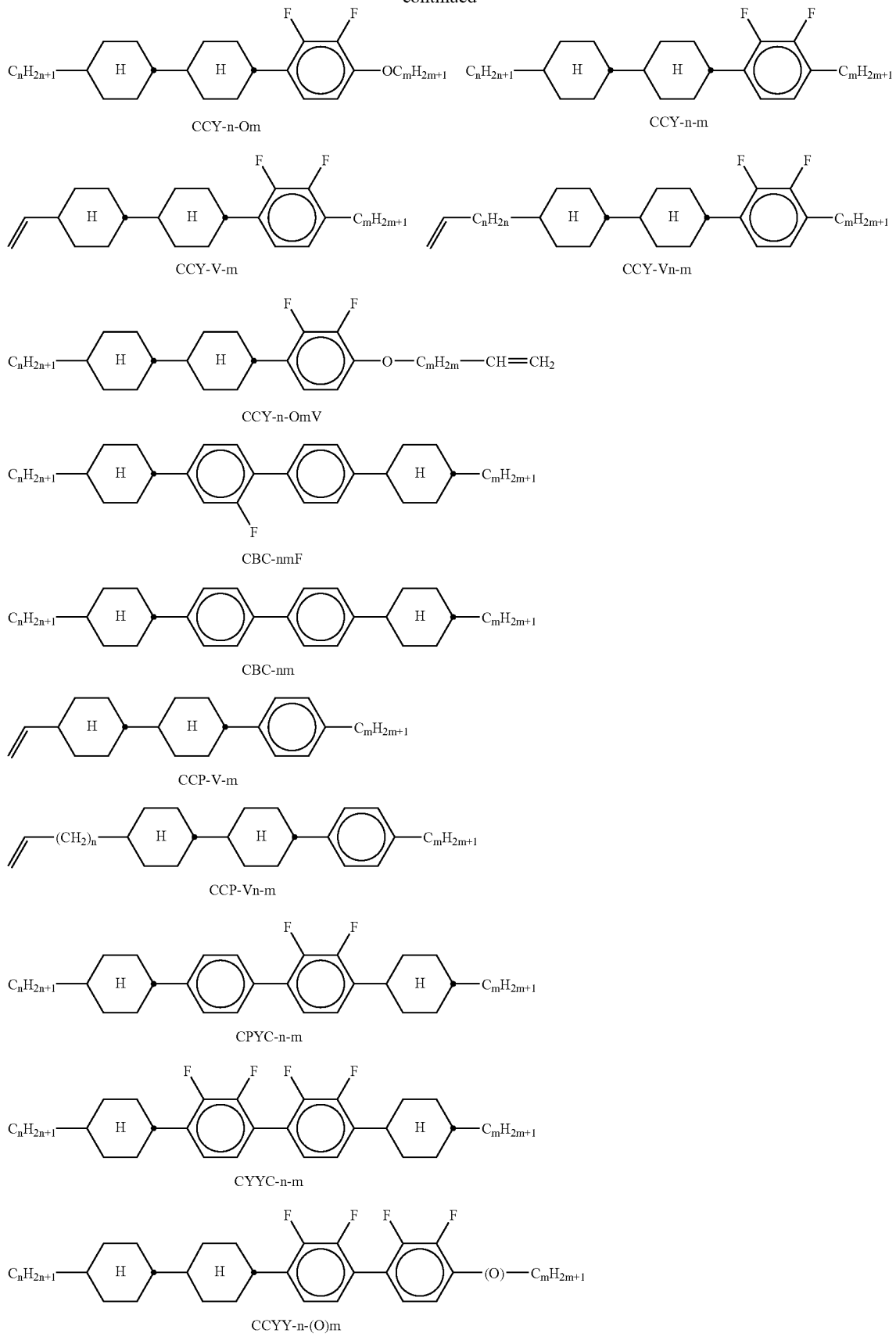

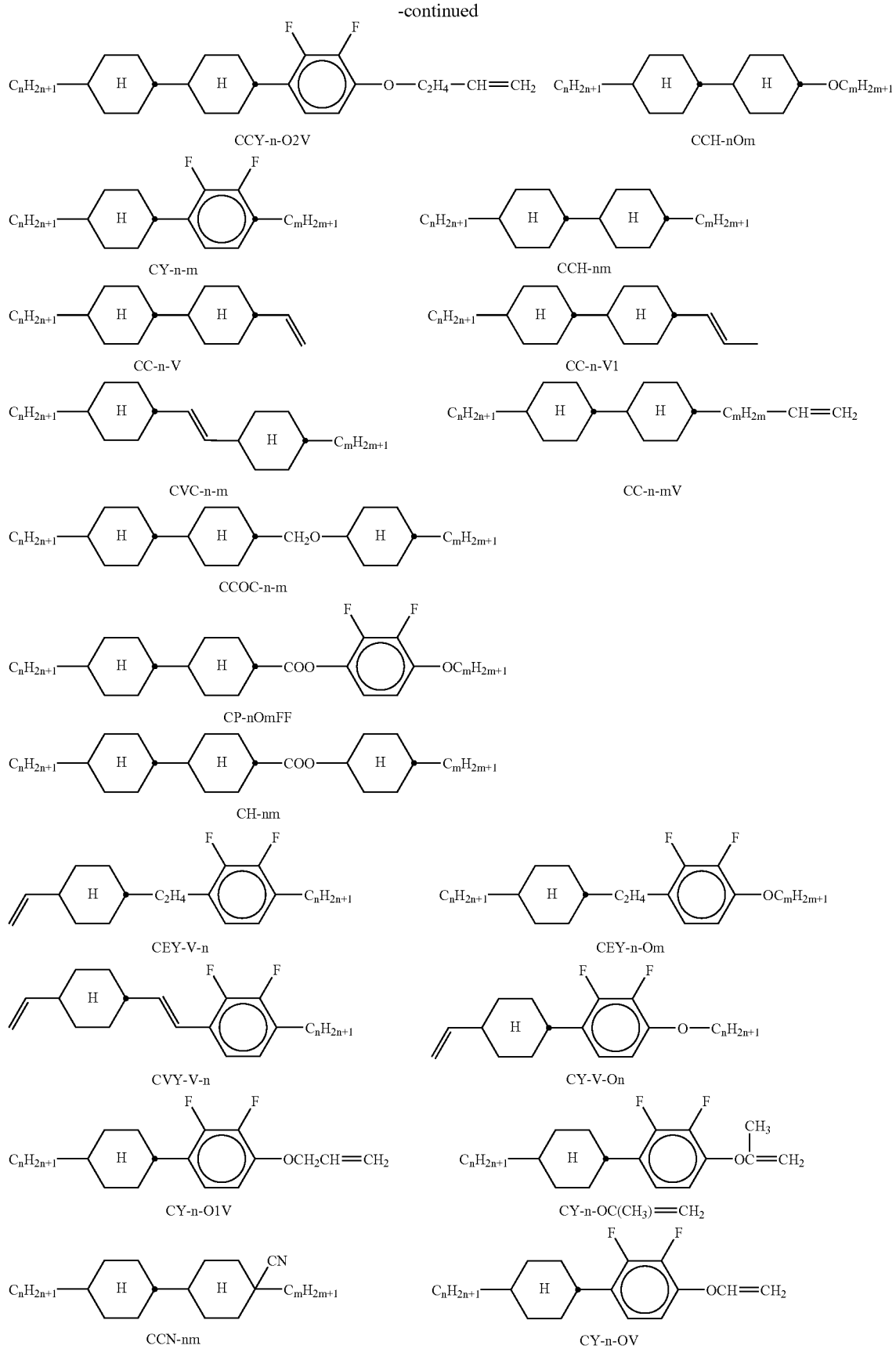

-continued
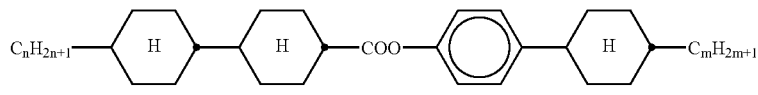
CCPC-nm
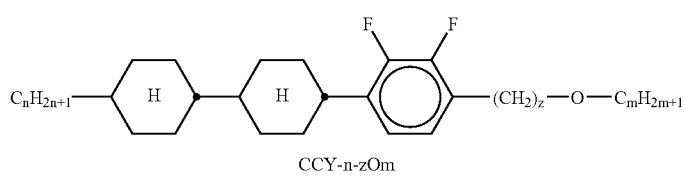
CCY-n-zOm
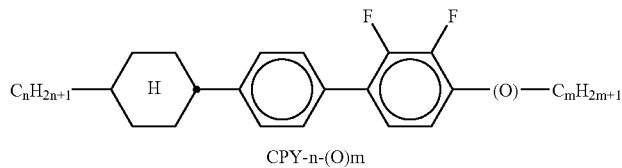
CPY-n-(O)m
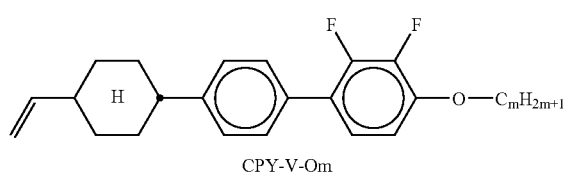
CPY-V-Om
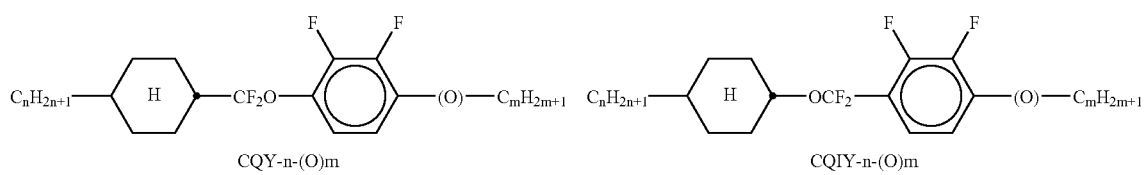
CQY-n-(O)m          CQIY-n-(O)m
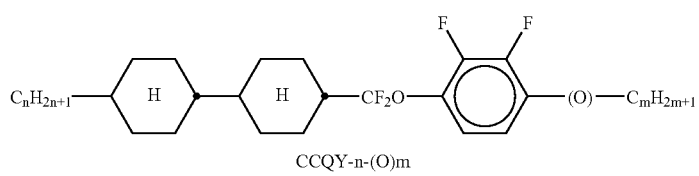
CCQY-n-(O)m
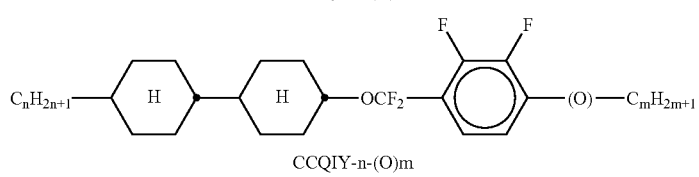
CCQIY-n-(O)m
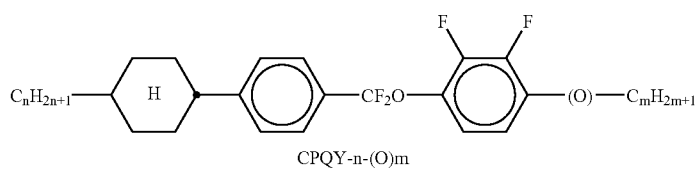
CPQY-n-(O)m
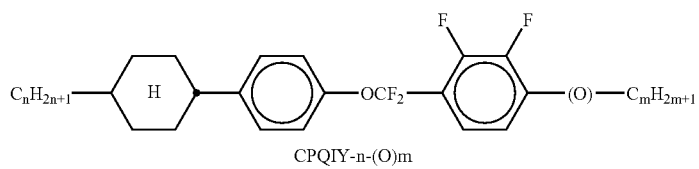
CPQIY-n-(O)m
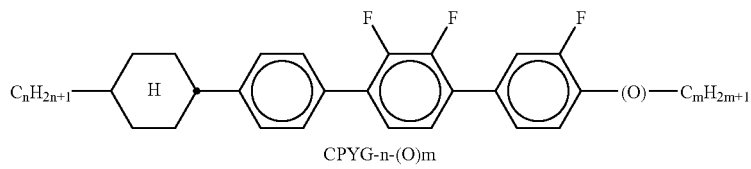
CPYG-n-(O)m

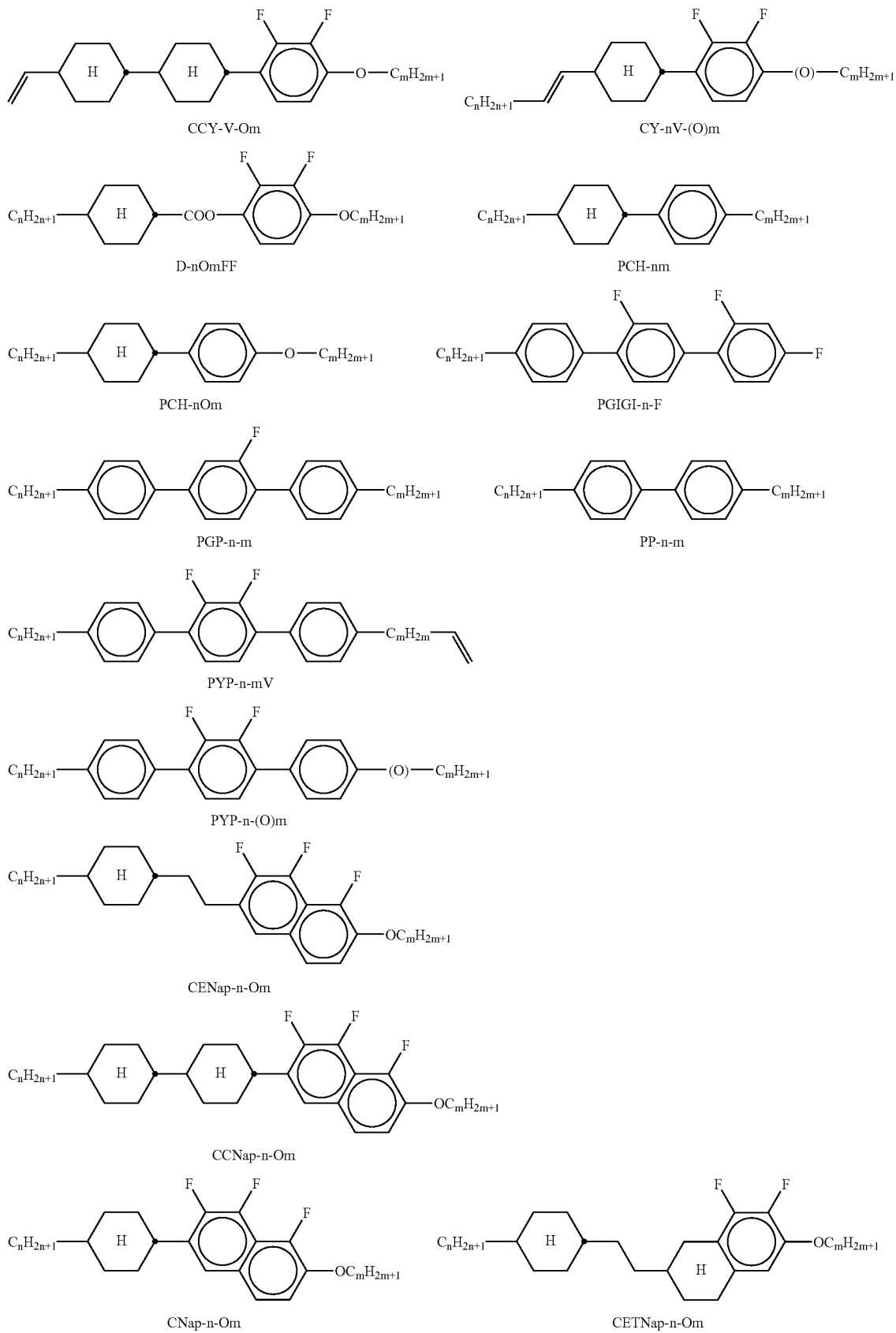

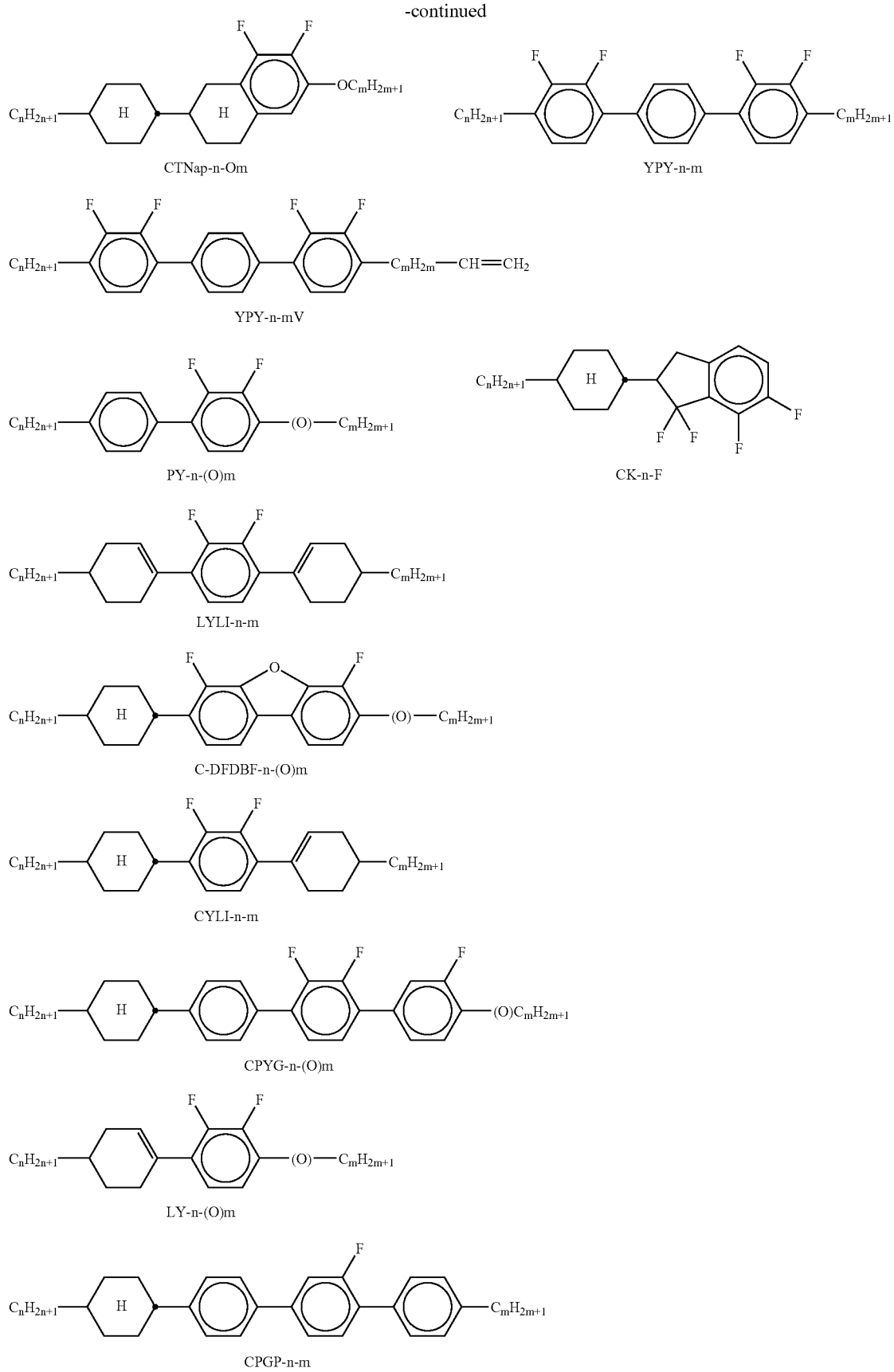

-continued

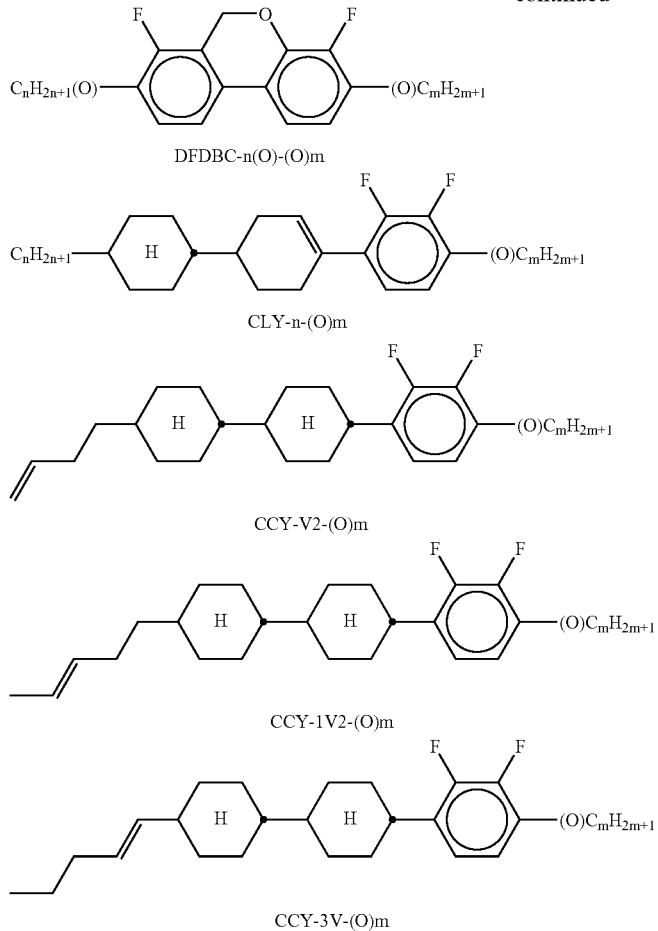

The liquid-crystal mixtures which can be used in accordance with the invention are prepared in a manner which is conventional per se. In general, the desired amount of the components used in lesser amount is dissolved in the components making up the principal constituent, advantageously at elevated temperature. It is also possible to mix solutions of the components in an organic solvent, for example in acetone, chloroform or methanol, and to remove the solvent again, for example by distillation, after thorough mixing.

By means of suitable additives, the liquid-crystal phases according to the invention can be modified in such a way that they can be employed in any type of, for example, ECB, VAN, IPS, GH or ASM-VA LCD display that has been disclosed to date.

The dielectrics may also comprise further additives known to the person skilled in the art and described in the literature, such as, for example, UV absorbers, antioxidants, nanoparticles and free-radical scavengers. For example, 0-15% of pleochroic dyes, stabilisers or chiral dopants may be added.

For example, 0-15% of pleochroic dyes may be added, furthermore conductive salts, preferably ethyldimethyldodecylammonium 4-hexoxybenzoate, tetrabutylammonium tetraphenylboranate or complex salts of crown ethers (cf., for example, Haller et al., Mol. Cryst. Liq. Cryst. Volume 24, pages 249-258 (1973)), may be added in order to improve the conductivity or substances may be added in order to modify the dielectric anisotropy, the viscosity and/or the alignment of the nematic phases. Substances of this type are described, for example, in DE-A 22 09 127, 22 40 864, 23 21 632, 23 38 281, 24 50 088, 26 37 430 and 28 53 728.

Table A shows possible dopants which can be added to the mixtures according to the invention. If the mixtures comprise a dopant, it is employed in amounts of 0.01-4% by weight, preferably 0.1-1.0% by weight.

TABLE A

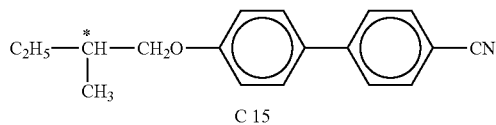

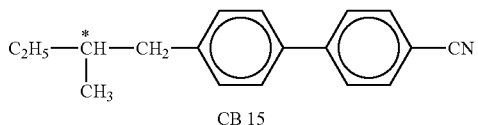

TABLE A-continued
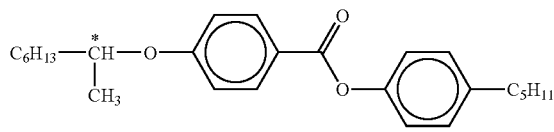
CM 21
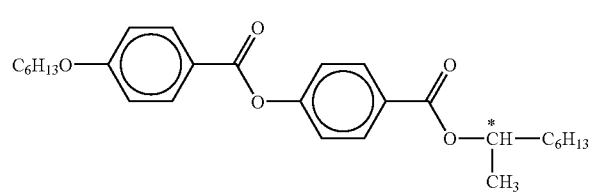
R/S-811
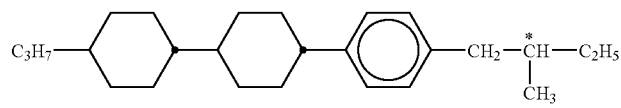
CM 44
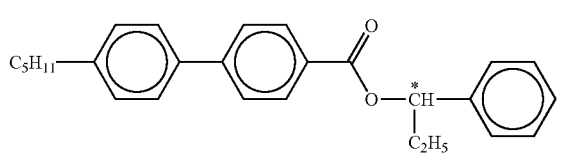
CM 45
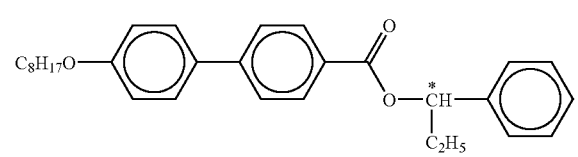
CM 47
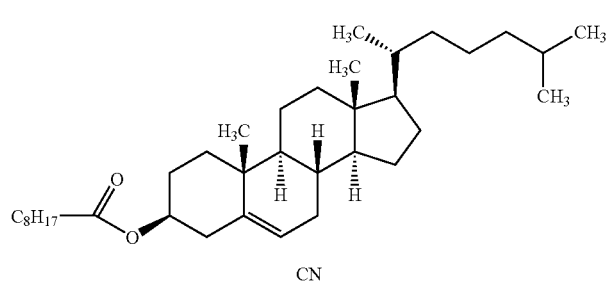
CN
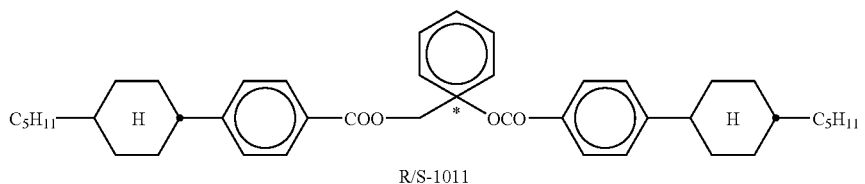
R/S-1011
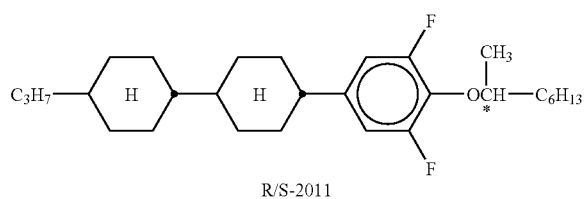
R/S-2011

TABLE A-continued
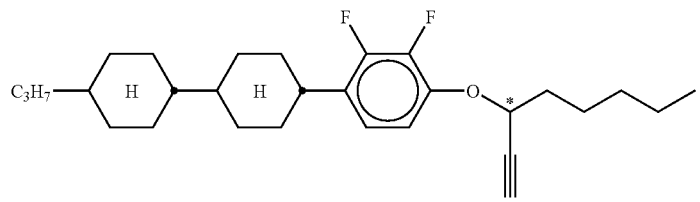
R/S-3011
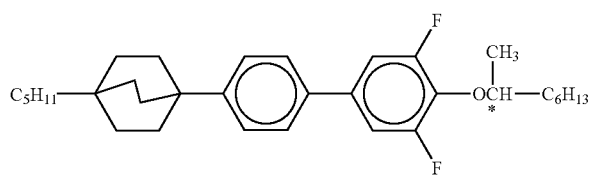
R/S-4011
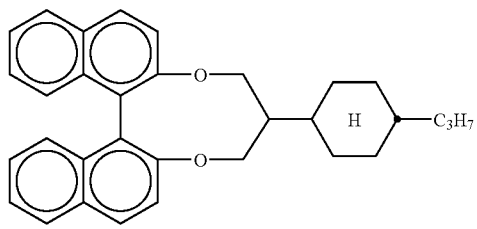
R/S-5011
Stabilizers which can be added, for example, to the mixtures according to the invention in amounts of up to 10% by weight, based on the total amount of the mixture, preferably 0.01 to 6% by weight, in particular 0.1 to 3% by weight, are shown below in Table B.
TABLE B
(n = 1-12)
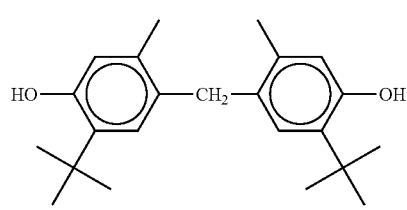
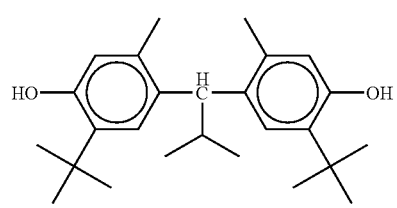
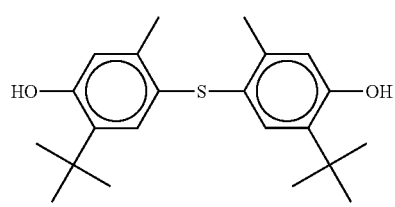
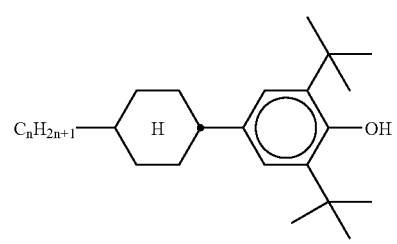

TABLE B-continued
(n = 1-12)
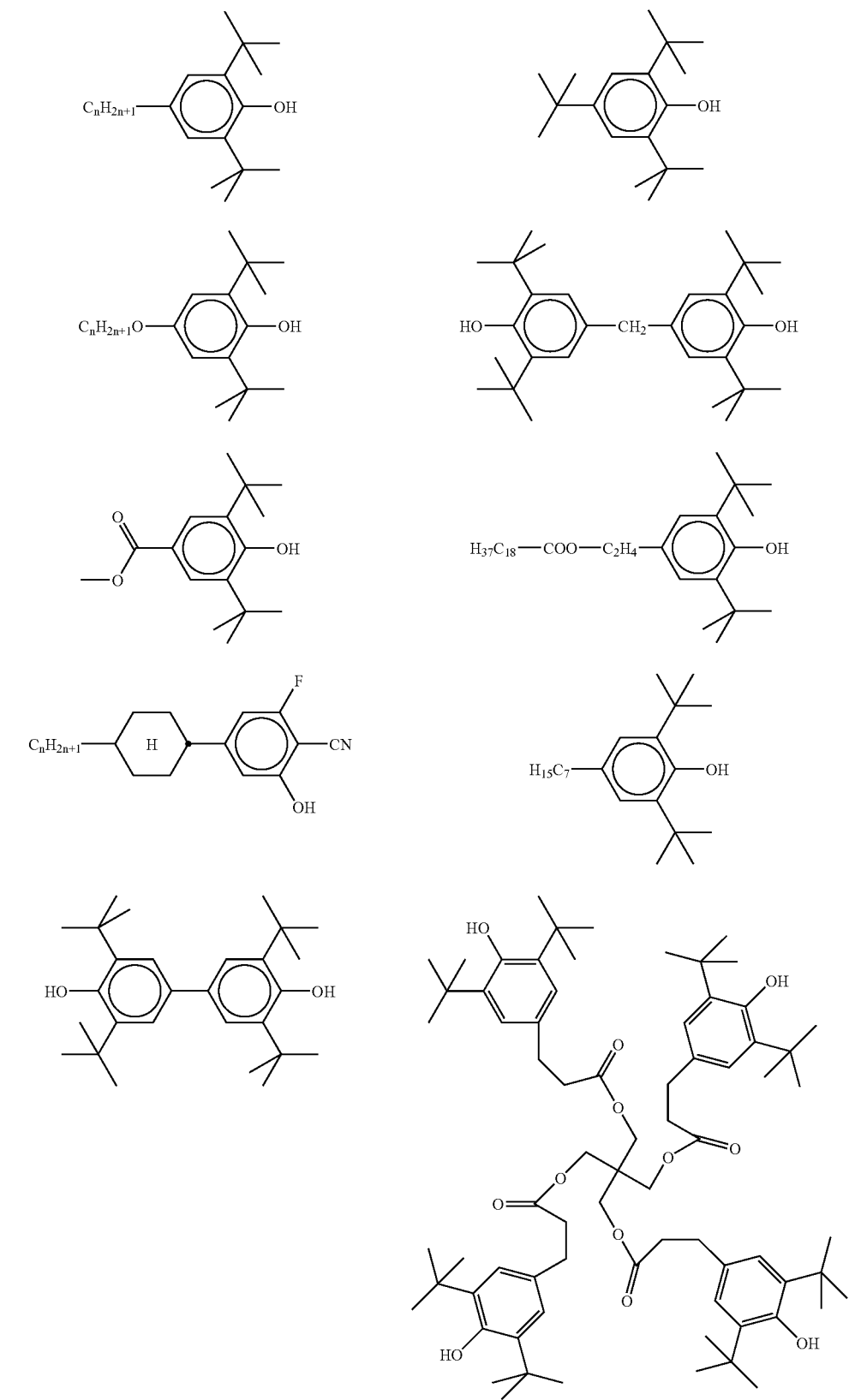

TABLE B-continued
(n = 1-12)
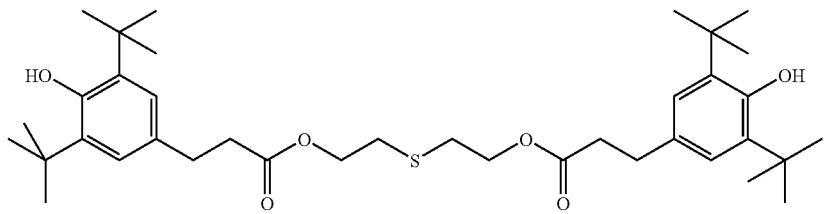
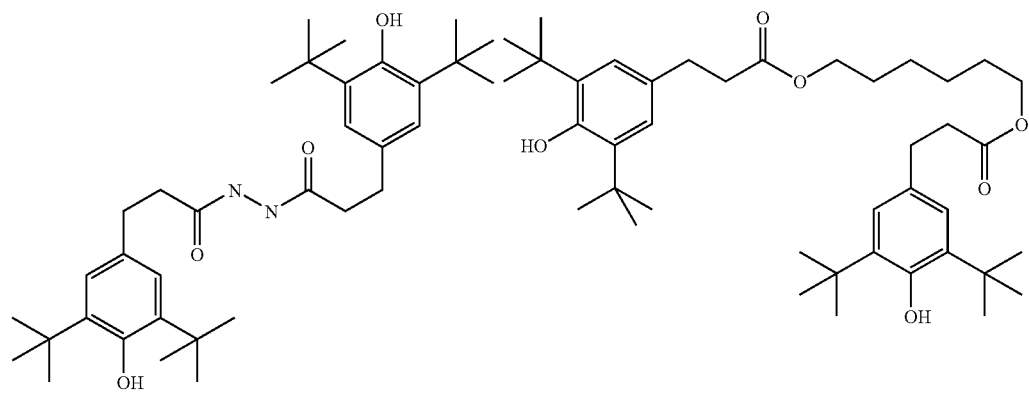
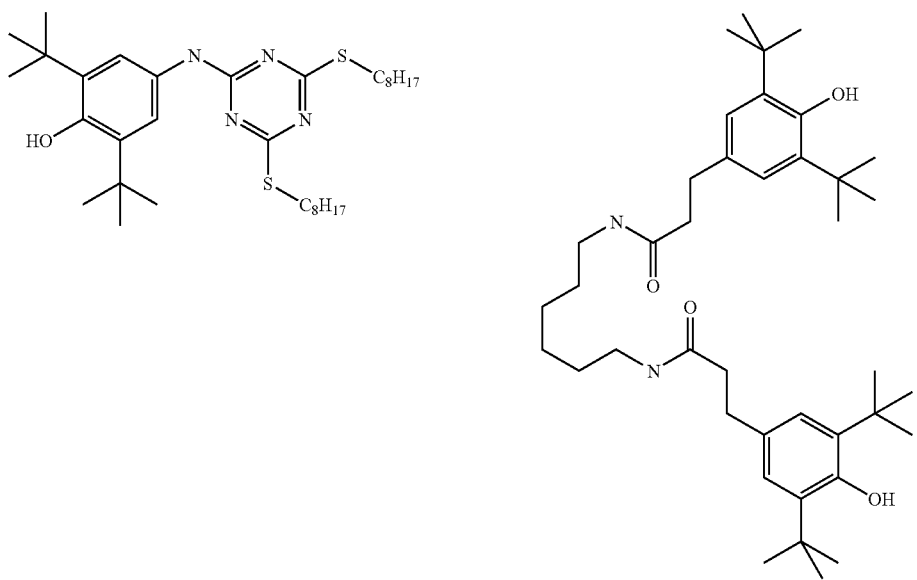

TABLE B-continued
(n = 1-12)
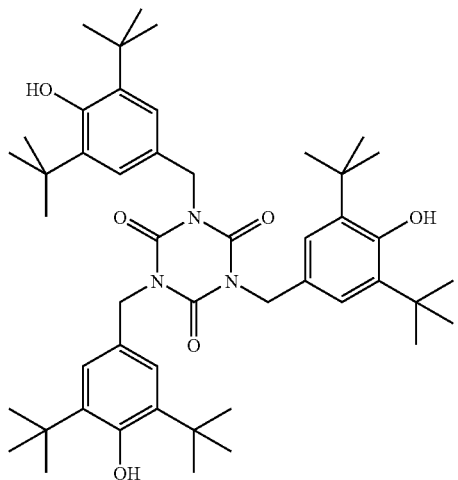
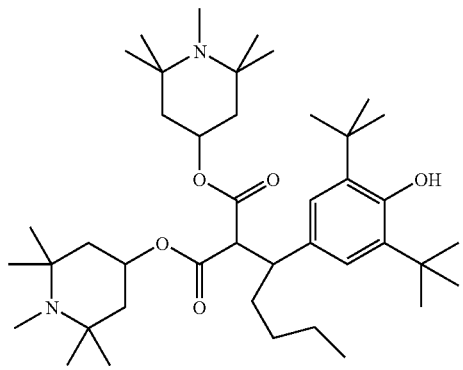
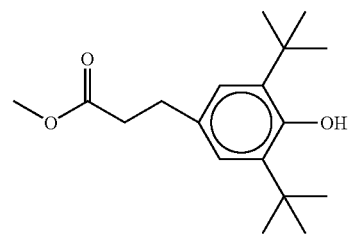
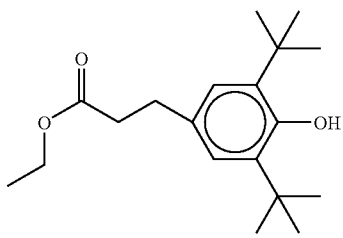
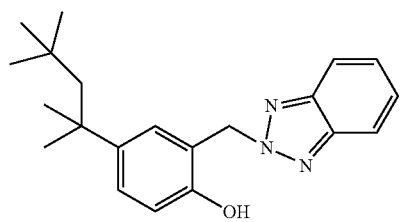
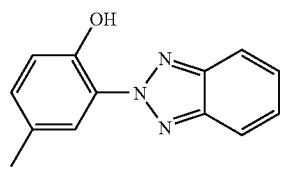
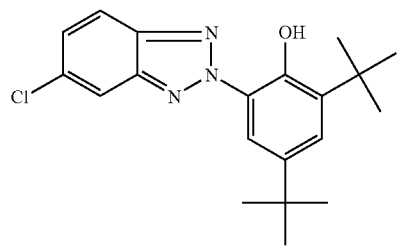
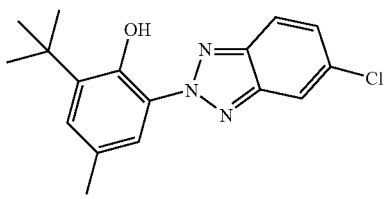
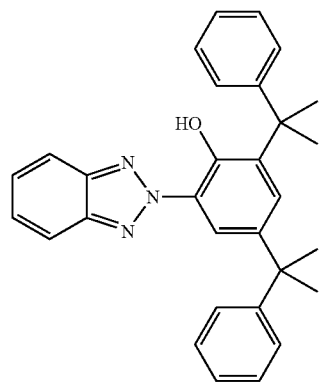
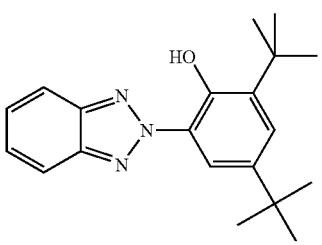

TABLE B-continued
(n = 1-12)
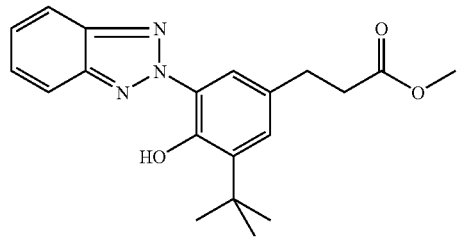
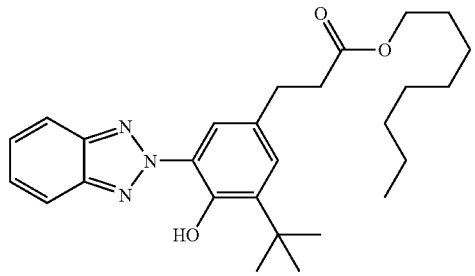
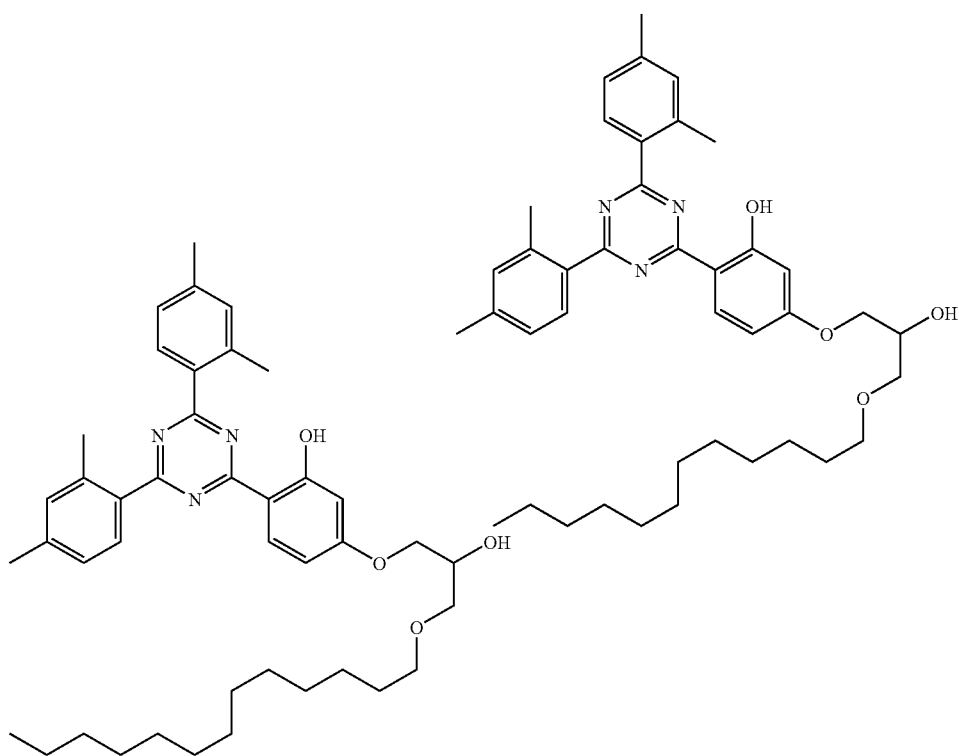
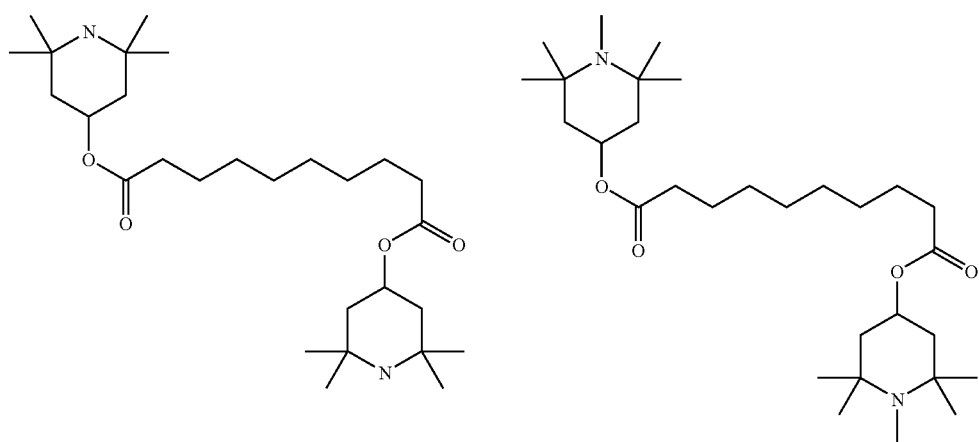

The following examples are intended to explain the invention without limiting it. Above and below, $V_o$ denotes the threshold voltage, capacitive [V] at 20° C.
Δn denotes the optical anisotropy measured at 20° C. and 589 nm
Δ∈ denotes the dielectric anisotropy at 20° C. and 1 kHz
cl.p. denotes the clearing point [° C.]
$K_1$ denotes the elastic constant, "splay" deformation at 20° C. [pN]
$K_3$ denotes the elastic constant, "bend" deformation at 20° C. [pN]
$γ_1$ denotes the rotational viscosity measured at 20° C. [mPa·s], determined by the rotation method a magnetic field
LTS denotes the low-temperature stability (nematic phase), determined in test cells
HR (20) denotes the voltage holding ratio at 20° C. [%]
HR (100) denotes the voltage holding ratio after 5 min. at 100° C. [%]
HR (UV) denotes the voltage holding ratio after UV exposure [%]

The display used for measurement of the threshold voltage has two plane-parallel outer plates at a separation of 20 μm and electrode layers with overlying alignment layers of SE-1211 (Nissan Chemicals) on the insides of the outer plates, which effect a homeotropic alignment of the liquid crystals.

All concentrations in this application are based on the corresponding mixture or mixture component, unless explicitly indicated otherwise. All physical properties are determined as described in "Merck Liquid Crystals, Physical Properties of Liquid Crystals", status November 1997, Merck KGaA, Germany, and apply for a temperature of 20° C., unless explicitly indicated otherwise.

MIXTURE EXAMPLES

Example 1

| CY-1V-O2 | 16.00% | Clearing point [° C.]: | 70 |
| CY-V-O4 | 14.00% | Δn [589 nm, 20° C.]: | 0.0819 |
| CCY-V-O2 | 10.00% | ∈‖: | 3.6 |
| CCY-V-O4 | 10.00% | ∈⊥: | 7.2 |
| CCY-V-1 | 9.00% | Δ∈ [1 kHz, 20° C.]: | −3.6 |
| CCY-V2-1 | 8.00% | $K_1$ [pN, 20° C.]: | 11.8 |
| CCH-34 | 9.00% | $K_3$ [pN, 20° C.]: | 14.3 |
| CCH-35 | 9.00% | $V_0$ [V, 20° C.]: | 2.11 |
| CC-5-V | 9.00% | $γ_1$ [mPa·s, 20° C.]: | 103 |
| CC-3-V1 | 6.00% | | |

Example 2

| CY-1V-O2 | 18.00% | Clearing point [° C.]: | 82.5 |
| CCY-V-O2 | 11.00% | Δn [589 nm, 20° C.]: | 0.1100 |
| CCY-1V-O4 | 11.00% | ∈‖: | 3.4 |
| CPY-V-O4 | 6.00% | ∈⊥: | 6.4 |
| PYP-2-2V | 15.00% | Δ∈ [1 kHz, 20° C.]: | −3.0 |
| CC-3-V1 | 11.00% | $K_1$ [pN, 20° C.]: | 13.2 |
| CC-4-V | 20.00% | $K_3$ [pN, 20° C.]: | 15.9 |
| CC-5-V | 8.00% | $V_0$ [V, 20° C.]: | 2.45 |
| | | $γ_1$ [mPa·s, 20° C.]: | 105 |

The preceding examples can be repeated with similar success by substituting the generically or specifically described reactants and/or operating conditions of this invention for those used in the preceding examples.

The entire disclosures of all applications, patents and publications, cited herein and of corresponding German application No. 102007007609.8, filed Feb. 13, 2007 are incorporated by reference herein.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A liquid-crystalline medium, comprising at least one compound of formula IA-31, IA-32, IA-33, IA-34, IA-35, IA-36, IA-37, IA-38, IA-39, IA-40, IA-41 and/or IA-42

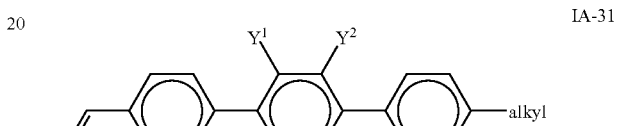

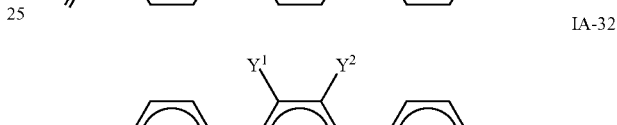

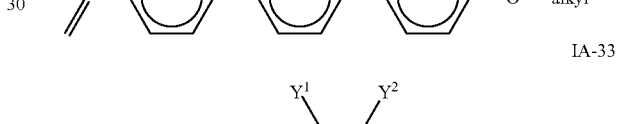

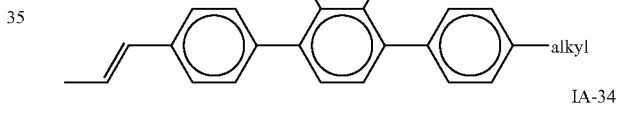

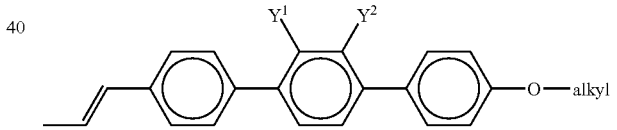

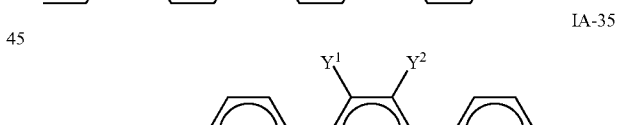

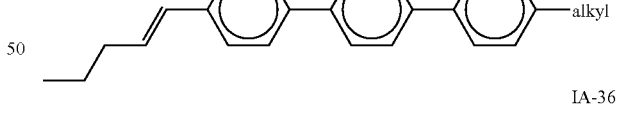

-continued

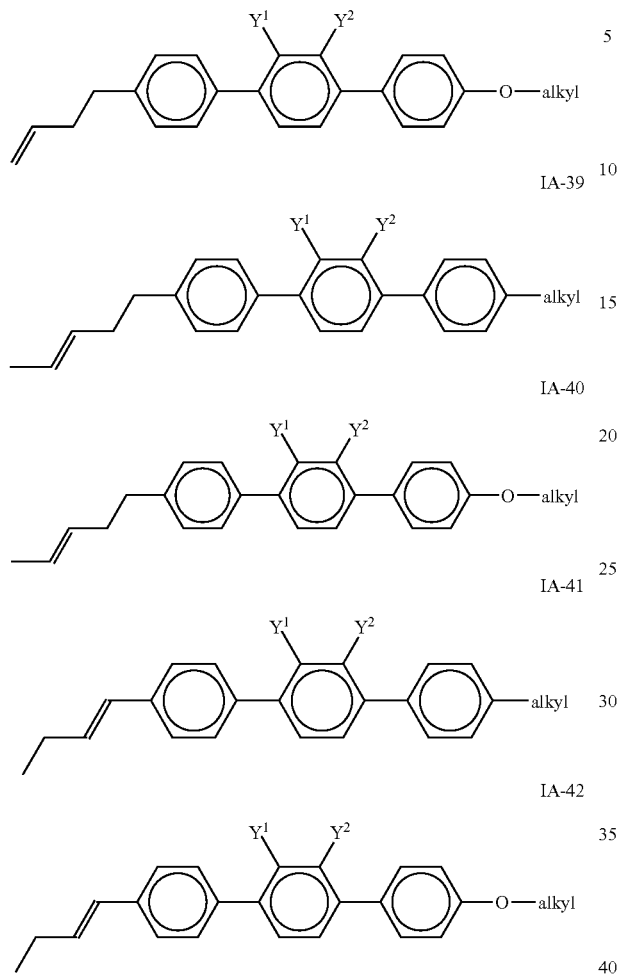

and at least one compound of formulae IB, IC and/or ID

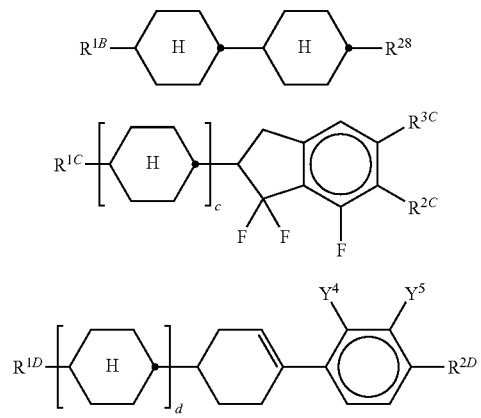

in which
R$^{1B}$ denotes an alkenyl radical having up to 6 C atoms which is unsubstituted, monosubstituted by CN or CF$_3$ or at least monosubstituted by halogen, in which option-ally, one or more CH$_2$ groups are, each independently of one another, replaced by —O—, —S—,

—C≡C—, —CF$_2$O—, —OCF$_2$—, —OC—O— or —O—CO— in such a way that O atoms are not linked directly to one another,
R$^{2B}$, R$^{1C}$,
R$^{1D}$ and R$^{2D}$ each, independently of one another, denote an alkyl or alkenyl radical having up to 6 C atoms which is unsubstituted, monosubstituted by CN or CF$_3$ or at least monosubstituted by halogen, in which optionally, one or more CH$_2$ groups are, each independently of one another, replaced by —O—, —S—,

—C≡C—, —CF$_2$O—, —OCF$_2$—, —OC—O— or —O—CO— in such a way that O atoms are not linked directly to one another,
Y$^1$, Y$^2$, Y$^4$
and Y$^5$ each, independently of one another, denote F, Cl, CF$_3$, CHF$_2$, CH$_2$F, OCF$_3$, OCH$_2$F, OCHF$_2$ or CN,
alkyl denotes a straight-chain alkyl radical having 1-6 C atoms
R$^{2C}$ denotes H or F,
R$^{3C}$ denotes H, CH$_3$, C$_2$H$_5$ or n-C$_3$H$_7$,
c denotes 1 or 2, and
d denotes 0 or 1.

2. A liquid-crystalline medium according to claim 1, further comprising one or more compounds of formulae IIA and/or IIB

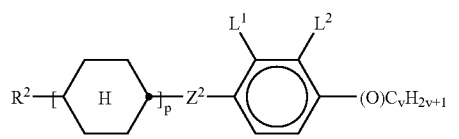

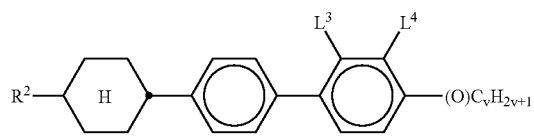

in which
R$^2$ denotes H or an alkyl or alkenyl radical having up to 15 C atoms which is unsubstituted, monosubstituted by CN or CF$_3$ or at least monosubstituted by halogen, in which optionally, one or more CH$_2$ groups are each, independently of one another, replaced by —O—, —S—,

—C≡—, —CO—, —CO—O—, —O—CO— or —O—CO—O— in such a way that O atoms are not linked directly to one another, $L^1$, $L^2$, $L^3$ and $L^4$ each, independently of one another, denote F or Cl, $Z^2$ denotes a single bond, —CH$_2$CH$_2$—, —CH=CH—, —CF$_2$O—, —OCF$_2$—, —CH$_2$O—, —OCH$_2$—, —COO—, —OCO—, —C$_2$F$_4$—, or —CF=CF—, p denotes 1 or 2, and v denotes 1 to 6.

3. A liquid-crystalline medium according to claim 1, further comprising one or more compounds of formula III

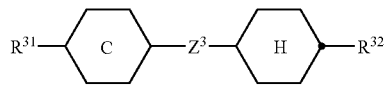

III in which $R^{31}$ and $R^{32}$ each, independently of one another, denote a straight-chain alkyl, alkoxyalkyl or alkoxy radical having up to 12 C atoms,

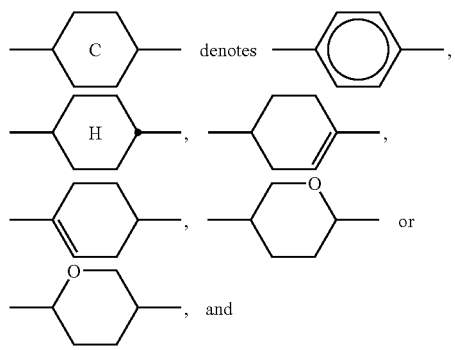

$Z^3$ denotes a single bond, —CH$_2$CH$_2$—, —CH=CH—, —CF$_2$O—, —OCF$_2$—, —CH$_2$O—, —OCH$_2$—, —COO—, —OCO—, —C$_2$F$_4$—, or —CF=CF—.

4. A liquid-crystalline medium according to claim 1, further comprising at least one compound of formulae IA-1 to IA-30 and/or IA-43 to IA-54

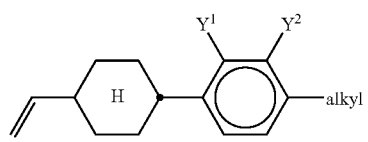
IA-1

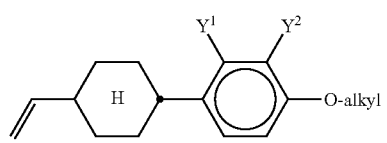
IA-2

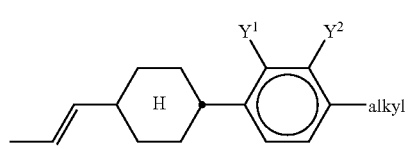
IA-3

-continued

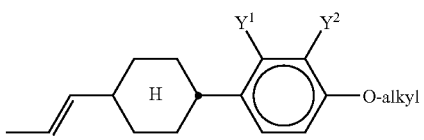
IA-4

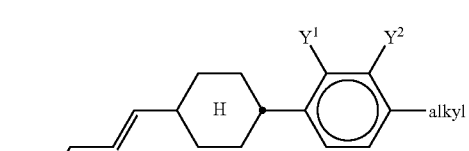
IA-5

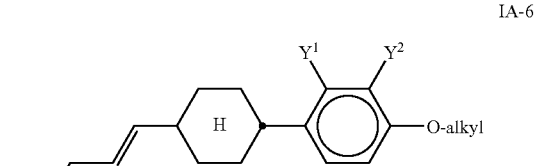
IA-6

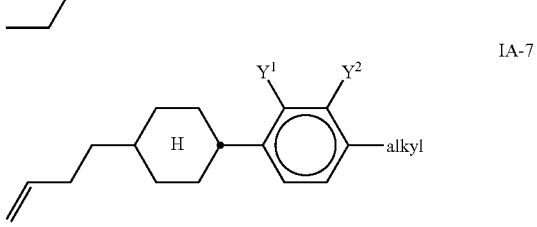
IA-7

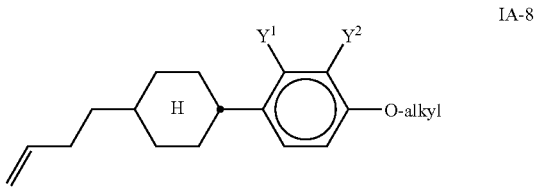
IA-8

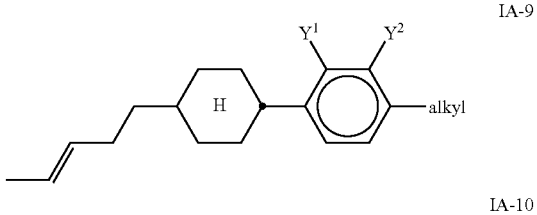
IA-9

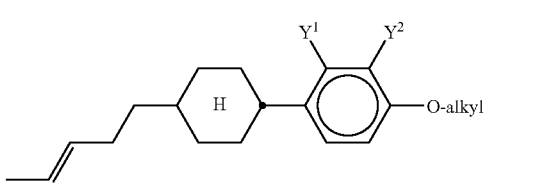
IA-10

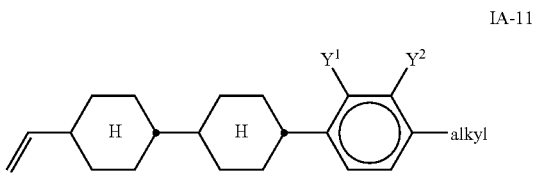
IA-11

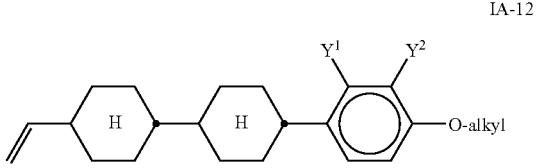
IA-12

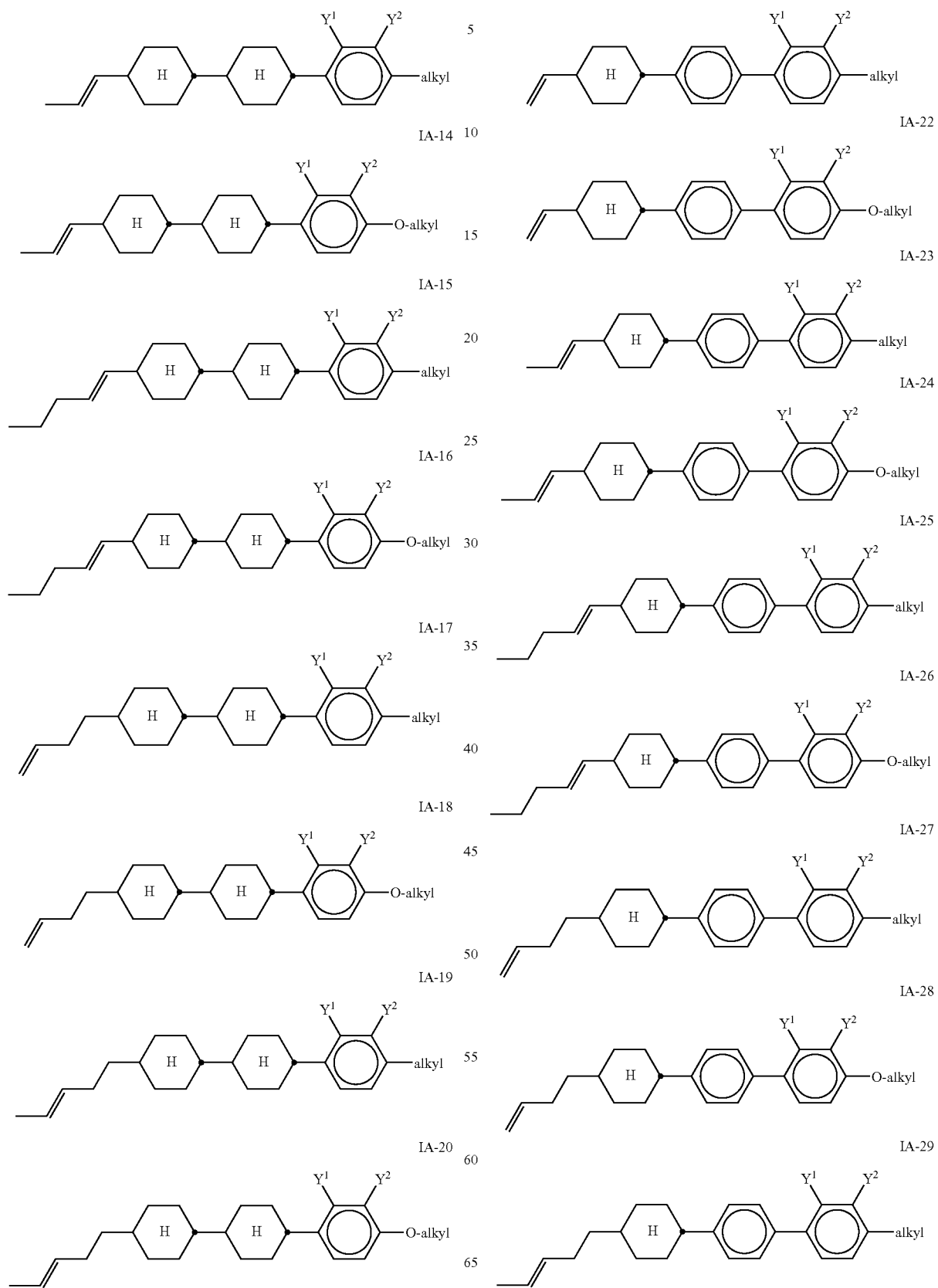

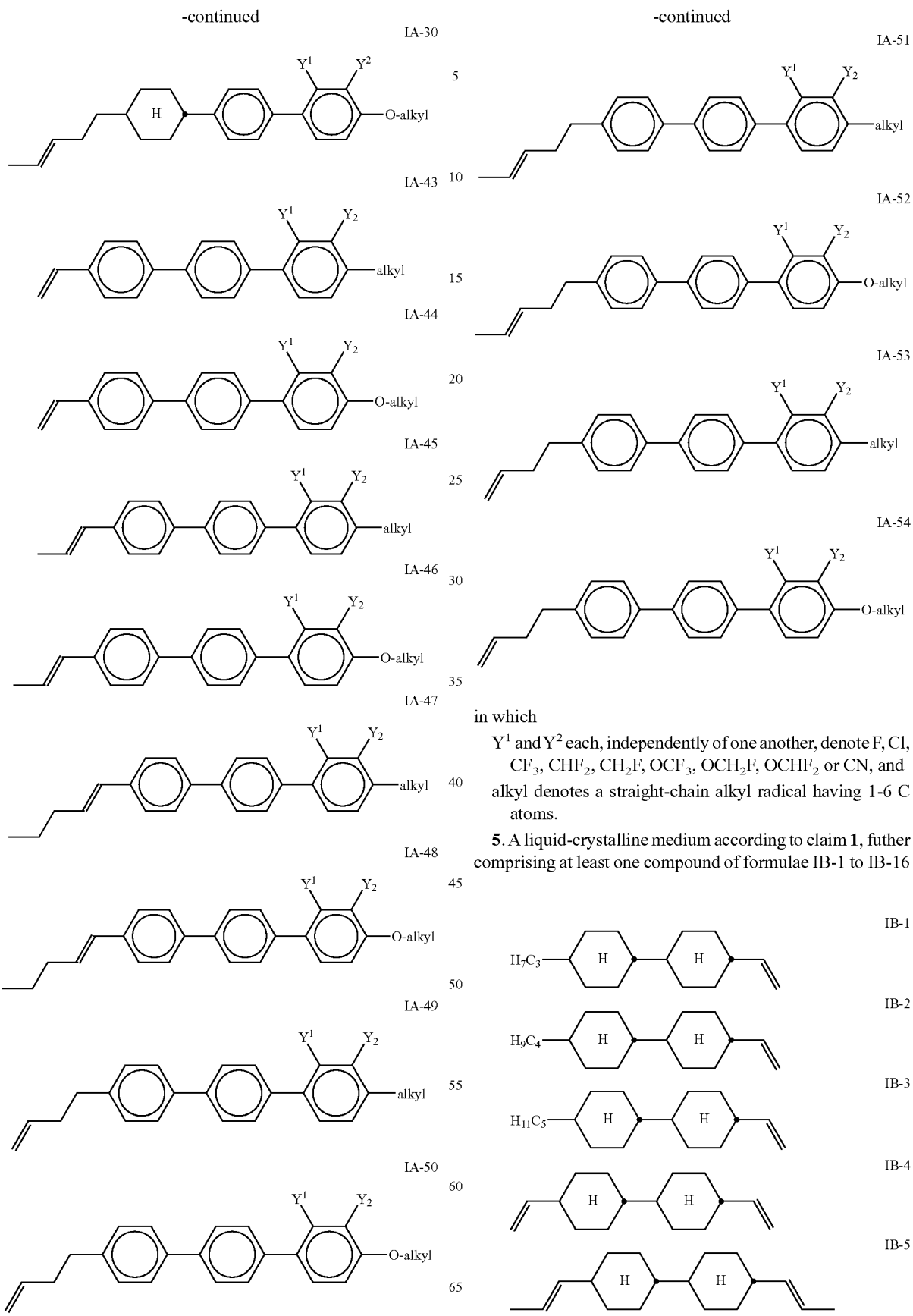
in which
Y¹ and Y² each, independently of one another, denote F, Cl, $CF_3$, $CHF_2$, $CH_2F$, $OCF_3$, $OCH_2F$, $OCHF_2$ or CN, and
alkyl denotes a straight-chain alkyl radical having 1-6 C atoms.
5. A liquid-crystalline medium according to claim 1, futher comprising at least one compound of formulae IB-1 to IB-16

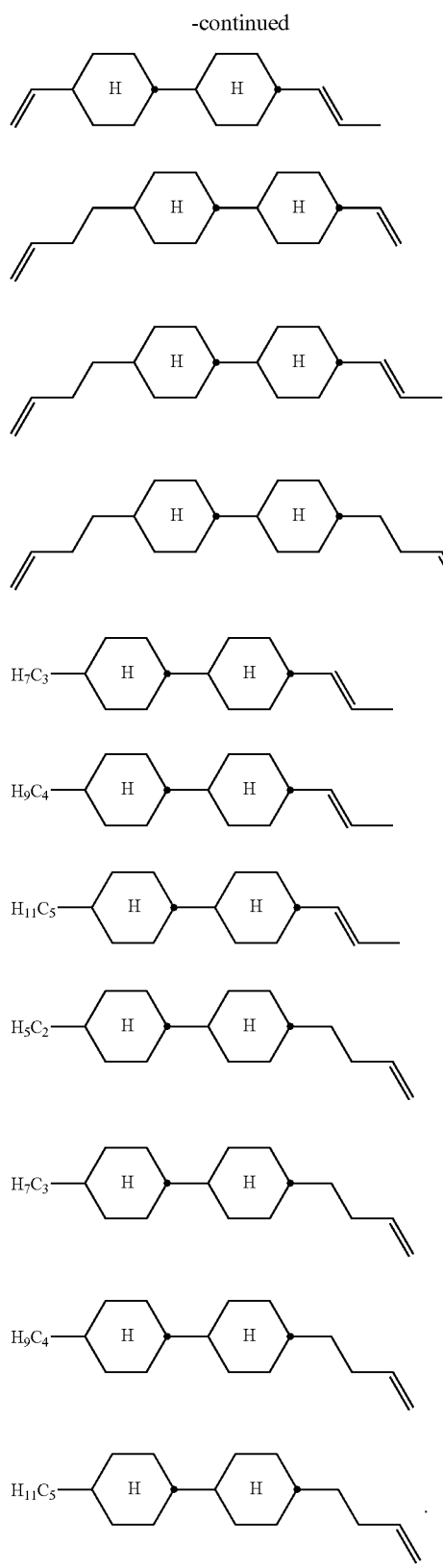
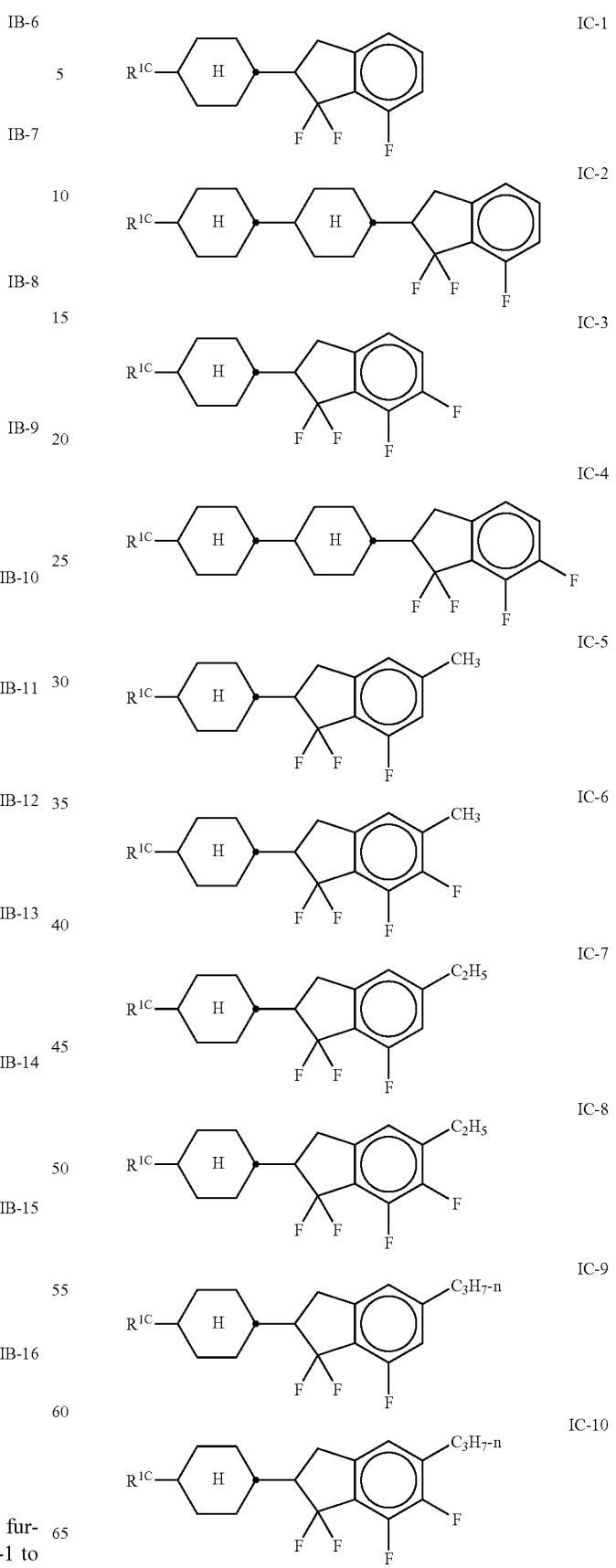
6. A liquid-crystalline medium according to claim 1, further comprising at least one compound of formulae IC-1 to IC-16

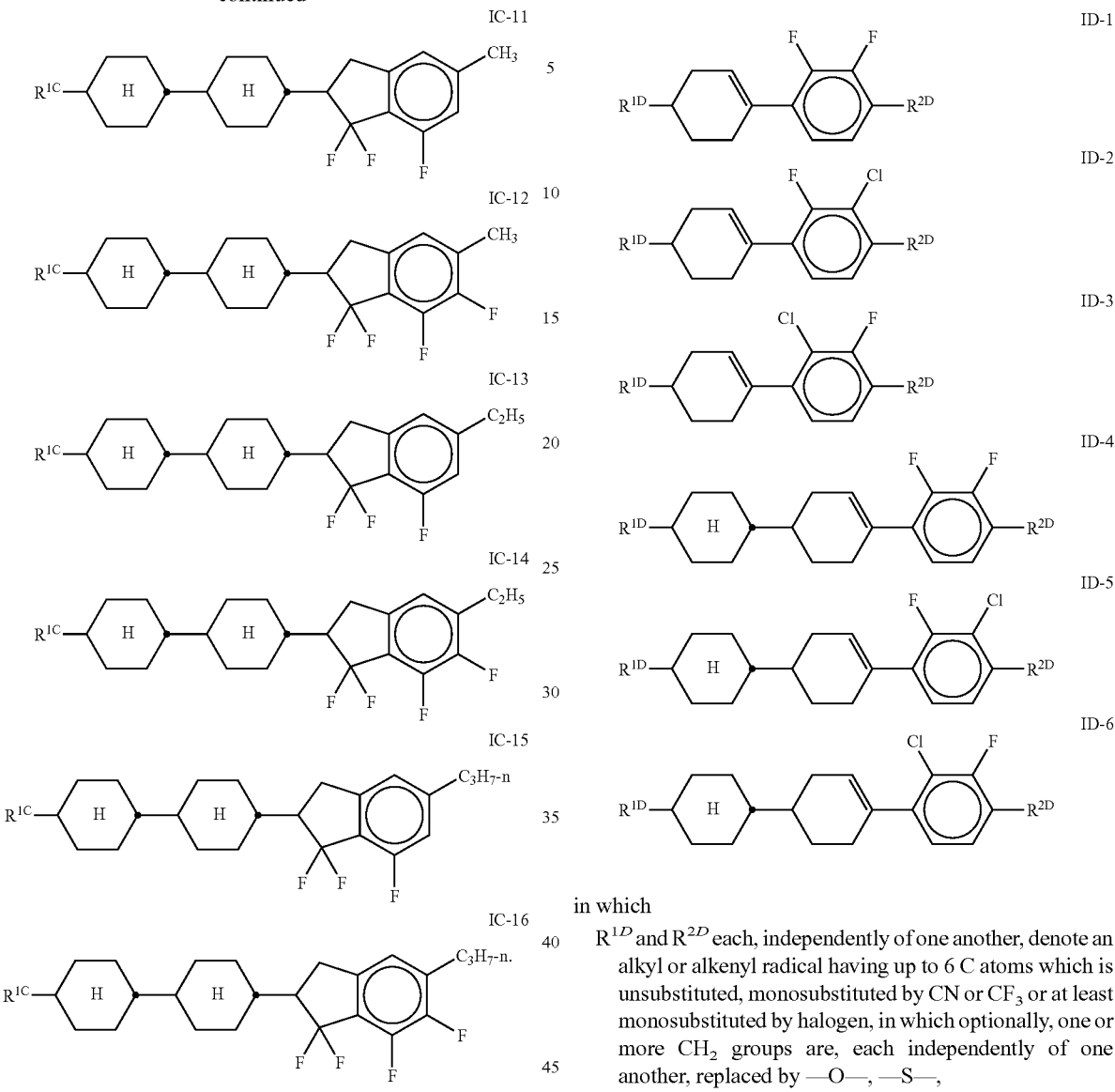

in which
R$^{1C}$ denotes an alkyl or alkenyl radical having up to 6 C atoms which is unsubstituted, monosubstituted by CN or CF$_3$ or at least monosubstituted by halogen, in which optionally, one or more CH$_2$ groups are, each independently of one another, replaced by —O—, —S—,

—C≡C—, —CF$_2$O—, —OCF$_2$—, —OC—O— or —O—CO— in such a way that O atoms are not linked directly to one another.

7. A liquid-crystalline medium according to claim 1, further comprising at least one compound of formulae ID-1 to ID-6 in which
R$^{1D}$ and R$^{2D}$ each, independently of one another, denote an alkyl or alkenyl radical having up to 6 C atoms which is unsubstituted, monosubstituted by CN or CF$_3$ or at least monosubstituted by halogen, in which optionally, one or more CH$_2$ groups are, each independently of one another, replaced by —O—, —S—,

—C≡C—, —CF$_2$O—, —OCF$_2$—, —OC—O— or —O—CO— in such a way that O atoms are not linked directly to one another.

8. A liquid-crystalline medium according to claim 1, further comprising one or more compounds of formulae IIA and/or IIB

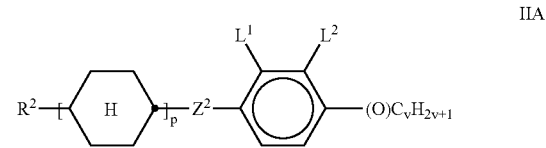

-continued

IIB

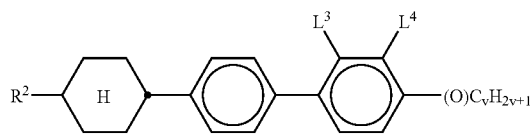

in which
R² denotes H, an alkyl radical having up to 15 C atoms, which is unsubstituted, monosubstituted by CN or $CF_3$ or at least monosubstituted by halogen, in which optionally, one or more $CH_2$ groups are, each independently, replaced by —O—, —S—,

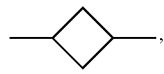

—C≡C—, —$CF_2O$—, —$OCF_2$—, —OC—O— or —O—CO— in such a way that O atoms are not linked directly to one another, $L^1$, $L^2$, $L^3$ and $L^4$ each, independently of one another, denote F or Cl, $Z^2$ denotes a single bond, —$CH_2CH_2$—, —CH=CH—, —$CF_2O$—, —$OCF_2$—, —$CH_2O$—, —$OCH_2$—, —COO—, —OCO—, —$C_2F_4$—, or —CF=CF—, p denotes 1 or 2, and v denotes 1 to 6.

9. A liquid-crystalline medium according to claim 1, wherein the proportion of the compounds of formula IA-31, IA-32, IA-33, IA-34, IA-35, IA-36, IA-37, IA-38, IA-39, IA-40, IA-41 and/or IA-42 in the medium as a whole is ≧5% by weight.

10. A process for preparing a liquid-crystalline medium according to claim 1, comprising mixing together at least one or more compounds of formula IA-31, IA-32, IA-33, IA-34, IA-35, IA-36, IA-37, IA-38, IA-39, IA-40, IA-41 and/or IA-42 with at least one or more compounds of formulae IB, IC and/or ID and optionally with further liquid-crystalline compounds and/or additives.

11. An electro-optical display having active-matrix addressing based on the ECB, PALC, FFS or the IPS effect, which contains, as dielectric, a liquid-crystalline medium according to claim 1.

12. A liquid-crystalline medium according to claim 1, further comprising one or more compounds of formula IA, which one or more compounds are not of formula IA-31, IA-32, IA-33, IA-34, IA-35, IA-36, IA-37, IA-38, IA-39, IA-40, IA-41 and/or IA-42

IA

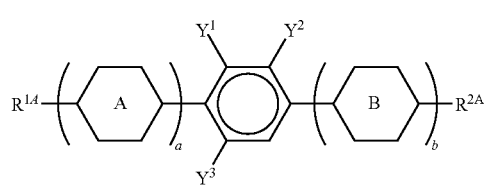

in which
$R^{1A}$ denotes an alkenyl radical having up to 6 C atoms which is unsubstituted, monosubstituted by CN or $CF_3$ or at least monosubstituted by halogen, in which optionally, one or more $CH_2$ groups are, each independently of one another, replaced by —O—, —S—,

—C≡C—, —$CF_2$—, —$OCF_2$—, —OC—O— or —O—CO— in such a way that O atoms are not linked directly to one another, $R^{2A}$ denotes an alkyl or alkenyl radical having up to 6 C atoms which is unsubstituted, monosubstituted by CN or $CF_3$ or at least monosubstituted by halogen, in which optionally, one or more $CH_2$ groups are, each independently of one another, replaced by —O—, —S—,

—C≡C—, —$CF_2O$—, —$OCF_2$—, —OC—O— or —O—CO—in such a way that O atoms are not linked directly to one another,

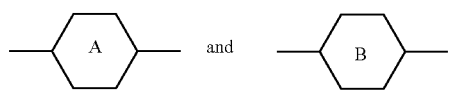

each, independently of one another, denote

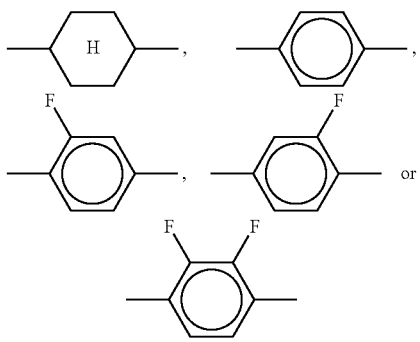

$Y^1$ and $Y^2$ each, independently of one another, denote F, Cl, $CF_3$, $CHF_2$, $CH_2F$, $OCF_3$, $OCH_2F$, $OCHF_2$ or CN, $Y^3$ denotes H or $CH_3$, and a and b each, independently of one another, denote 0, 1 or 2, where a+b is ≧1.

* * * * *